(12) United States Patent
Hüttenhofer et al.

(10) Patent No.: US 7,295,891 B2
(45) Date of Patent: Nov. 13, 2007

(54) METHOD AND DEVICE FOR CONTROLLING MOVEMENTS IN THE CASE OF MANIPULATORS

(75) Inventors: Manfred Hüttenhofer, Meitingen (DE); Günther Wiedemann, Gersthofen (DE); Stefan Burkhart, Dillingen (DE)

(73) Assignee: KUKA Roboter GmbH (DE)

( * ) Notice: Subject to any disclaimer, the term of this patent is extended or adjusted under 35 U.S.C. 154(b) by 467 days.

(21) Appl. No.: 10/702,673

(22) Filed: Nov. 5, 2003

(65) Prior Publication Data

US 2004/0133309 A1 Jul. 8, 2004

(30) Foreign Application Priority Data

Nov. 6, 2002 (DE) .................... 102 51 600

(51) Int. Cl.
*G06F 19/00* (2006.01)

(52) U.S. Cl. .............. 700/245; 700/246; 700/248; 700/250; 700/251; 700/253; 700/254; 700/255; 700/257; 700/259; 700/260; 700/262; 700/264; 219/124.33; 219/219.34; 219/125.1; 318/568.1; 318/568.11; 318/568.13; 318/568.14; 318/568.16; 318/568.21; 318/568.23; 901/4; 901/43; 901/47

(58) Field of Classification Search ............... 700/245
See application file for complete search history.

(56) References Cited

U.S. PATENT DOCUMENTS

| | | | |
|---|---|---|---|
| 4,571,149 A * | 2/1986 | Soroka et al. | 414/749.1 |
| 5,602,968 A * | 2/1997 | Volpe | 700/262 |
| 2004/0211284 A1* | 10/2004 | Roy et al. | 74/490.01 |
| 2004/0267404 A1* | 12/2004 | Danko | 700/245 |
| 2005/0107808 A1* | 5/2005 | Evans et al. | 606/139 |

FOREIGN PATENT DOCUMENTS

| | | |
|---|---|---|
| EP | 0 268 491 A | 5/1988 |
| EP | 0 483 756 A | 5/1992 |
| EP | 0 963 817 A | 12/1999 |
| EP | 1 326 151 A | 7/2003 |

* cited by examiner

*Primary Examiner*—Thomas Black
*Assistant Examiner*—McDieunel Marc
(74) *Attorney, Agent, or Firm*—McGlew and Tuttle, PC (57) ABSTRACT

In a method for controlling the movement of a manipulator associated with an interpretation of a given point sequence of poses (positions and orientations) by splines, the motion components are separately parameterized. Thus, marked, subsequent changes to the orientation of robot axes have no undesired effects on the Cartesian movement path of the robot. Suitable algorithms are provided for orientation control by using quaternions or Euler angles.

27 Claims, 6 Drawing Sheets

METHOD AND DEVICE FOR CONTROLLING MOVEMENTS IN THE CASE OF MANIPULATORS

FIELD OF THE INVENTION

The invention relates to a method for controlling movements of a manipulator, such as an industrial robot, comprising an interpolation of a given point sequence of poses (positions and orientations) by splines and a device, more particularly suitable for performing the method according to the invention.

BACKGROUND OF THE INVENTION

Movements of controlled manipulators, e.g. industrial robots, are generally determined by a preestablished sequence of points in a multidimensional space. In the case of a multiaxial industrial robot each of these points incorporates the Cartesian coordinates of positions and coordinates with respect to the orientation in three-dimensional Euclidean space and optionally coordinates of auxiliary axes.

As a rule a robot movement is not rigidly predetermined, but instead merely has a number of fixed points, which are based on the operations to be performed, e.g. the taking up and setting down of workpieces, passing round obstacles, etc. The fixed points are taught to the robot control used for movement control purposes in a manual manner by starting and storing the corresponding poses and are then available as a point sequence with respect to which the robot movement to be executed must be oriented, i.e. all the fixed points clearly define the resulting path curve.

In order to obtain a handy, functional description in place of a point sequence and permit the continuity of the robot movement in all components of motion, the point sequence is generally interpolated. A functional description of the point sequence obtained by interpolation serves a number of purposes. Firstly the data quantity is compressed and secondly it is possible to obtain informations with respect to values not contained in the point sequence, e.g. by extrapolation. Finally, a higher evaluation rate occurs, because the evaluation of a function can often be implemented faster than a reference in a table.

In the industrial practice of movement control for interpolating the aforementioned point sequences use is frequently made of spline functions, which satisfy tailor-made demands, particularly with respect to the smoothness of the curve obtained, the continuity and differentiatability of the first derivative thereof and the continuity of the second derivative thereof. As the first and second derivatives of a path curve can be identified with the speed or acceleration of an object moved along the curve, said characteristics are of great importance for an efficient movement control of industrial robots.

A known method for the movement control of industrial robots using spline interpolations is described in an article by Horsch and Jüttler (Computer-Aided Design, vol. 30, pp 217-224, 1998). The contour of a robot movement is represented sectionwise by means of a suitable degree or order polynomial.

In the known method for the movement control of industrial robots by spline interpolation, it has proved disadvantageous that in sections of the point sequence to be interpolated in which changes to the orientation, the Cartesian position and possibly the position of the additional axes occur in widely differing form (e.g. minimum Cartesian changes with large orientation changes), undesired, uneconomic movement paths can occur. In particular, in such cases movement loops can occur, i.e. one or more components of the robot movement locally lead to an inefficient moving backwards and forwards, because the movement guidance in this specific section of the point sequence is dominated by significant changes in other components of motion. It is also considered disadvantage with per se fixed movement paths a subsequent pronounced change to individual components of motion, e.g. the subsequent programming of a strong reorientation, can have an effect on the behaviour of the other components of motion, so that e.g. as a consequence of the reorientation the Cartesian contour of the path also changes, which is unacceptable for the user.

For the orientation guidance of Cartesian movements, which are e.g. in the form of splines, frequent use is made of quaternions. Quaternions are generalized complex numbers in the form of a number quadruple, which can be represented as a real-value scalar part and complex-value three-vector. Quaternions are closely linked with the matrix representation of rotations and are therefore preferably used for the orientation guidance in computer animations and for robot control purposes. A point sequence of robot orientations is consequently represented by a four-dimensional spline in the quaternion space.

In order to obtain in this connection an optimum favourable, uniform parametrization of the orientation movement, the spline in the quaternion space should as far as possible be on the surface of the unit sphere. It is only in this way possible to achieve a uniform parametrization of the projection of the quaternion spline on the unit sphere, because on converting quaternions into rotation matrixes each quaternion qi must be standardized. Through the reduction of the four-dimensional quaternion spline to three degrees of freedom during projection on the unit sphere (standardization of the quaternion spline or the individual quaternions), the risk arises of a distorted parametrization of the standardized spline, which can in turn lead to an undesired movement behaviour of a robot controlled in this way.

In the known spline interpolation method there is a parametrization of the movement or spline by means of a common parameter, often called the motion parameter t and which is related to the time coordinate τ (cf. Horsch and Jüttler, top left on p 221). For a given point sequence $P_i$, i=1, . . . , n, the length of the parametrization interval $[t_i, t_{i+1}]$ is generally considered to be proportional to the spacing of the associated points $P_i$, $P_{i+1}$. Into said spacing is introduced both the Cartesian distance and changes to the orientation and optionally auxiliary axes. However, it has been found that a parametrization by means of only a single parameter gives to the aforementioned disadvantages.

The problem of the invention is to further develop a method and device of the aforementioned type in such a way that there are no undesired, uneconomic path movements, such as loops or the like. In addition, movement or motion control is to take place in such a way that reorientation from point to point is at a minimum.

SUMMARY OF THE INVENTION

In the case of the method of the aforementioned type., the set problems are solved by the invention in that components of the motion are separately parametrized. In a device of the aforementioned type, the set problems are solved in that it has an interpolation device, which is constructed for the separate parametrization of components of motion during interpolation.

According to the invention, through the separate parametrization of all the components of $P_i$, which must not influence one another, e.g. the Cartesian position and orientation, the aforementioned disadvantages are avoided.

According to a further development of the invention, the Cartesian positions of the manipulator are parametrized or parametrizable separately from the associated orientations.

If the manipulator to be controlled has auxiliary axes, according to a further development of the invention, movements of auxiliary axes are parametrized or parametrizable separately from the positions and/or orientations of the manipulator.

In order to utilize the known, suitable characteristics of quaternions in the description of rotary movements in space, according to a preferred development of the invention, an orientation guidance takes place by means of quaternions $q_i$, $i=1, \ldots, n$ and the device according to the invention is set up for such an orientation guidance.

Alternatively, according to a further development of the invention, an orientation guidance takes place by means of successive rotations with Euler angles $A_i$, $B_i$, $C_i$, $i=1, \ldots, n$, and the device according to the invention is set up for such an orientation guidance and in each case directly succeeding rotations take place about axes perpendicular to one another.

Preferably, in this connection, use is made of extended or expanded Euler angles with $A_i$, $B_i$, $C_i \in R$ (R: quantity of real numbers).

In this way, according to the invention, a uniform parametrization of the orientation is always ensured and for the representation thereof only three degrees of freedom are required. In this connection, the standard Euler angles are inventively expanded to the total $R^3$, which ensures minimum reorientations. It has surprisingly been found that by removing the limitation of the definition range of Euler angles, much more economic movement paths can be determined.

BRIEF DESCRIPTION OF THE DRAWINGS

Further advantages and features of the invention can be gathered from the claims and the subsequent description of specific embodiments relative to the attached drawings, wherein show:

DETAILED DESCRIPTION OF THE DRAWINGS

Figure 1A:
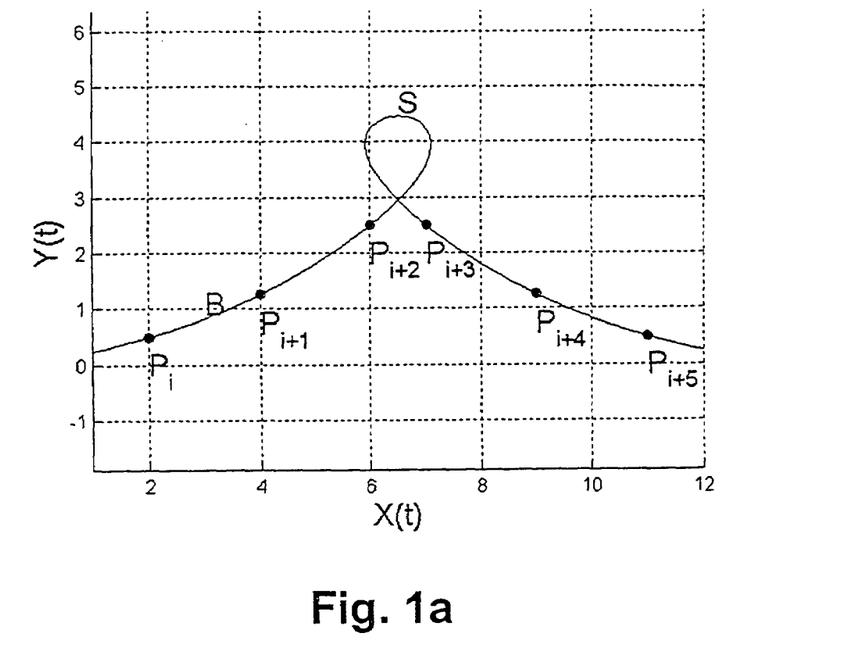
FIG. 1a a path curve of a robot movement in two dimensions according to the prior art with undesired loop formation.

In a simplified, two-dimensional representation, FIG. 1a shows a Cartesian motion contour B for the motion of an industrial robot. It is possible to see two Cartesian coordinates x(t), y(t), which are dependent on a common parameter t, which is generally related to a time coordinate. At S the path contour B has a loop, i.e. over the associated interval of parameter t, the robot performs a generally undesired, because uneconomic forward and backward movement in the x and/or y direction and which should be avoided in practice. Curve B interpolates a predetermined sequence of points Pi, which give the course of the robot movement in a multidimensional space. The points $P_i$ can be taught the robot control responsible for the movement control or this is obtained online during a manipulation process, e.g. from sensor informations or the like. For interpolating $P_i$ during robot movements use is made of standard splines (Horsch and Jüttler, loc. cit.). Hereinafter $$P_i = (X_i, Y_i, Z_i, A_i, B_i, C_i, E_i, \ldots, Em) \in R^{6+m}, i=1, \ldots, n$$

are the robot positions to be interpolated (for a 6 axis robot with m auxiliary axes E1 to Em). Thus, what is sought is a parametrization of a spline Sp of the desired contour, i.e.

$$Sp(t_i) = P_i \text{ for all } i=1, \ldots, n \text{ and } t_1 < t_2 < t_3 < \ldots < t_n,$$

which leads to an optimum smooth curve. In order to obtain a favourable contour, the length of the parametrization intervals $[t_i, t_{i+1}]$ is generally chosen proportional to the spacing of the associated points $P_i, P_{i+1}$. Into said spacing must be introduced both the Cartesian distance and the orientation change and possibly auxiliary axis changes. This procedure is intended to avoid undesired loops.

A spline is generally a piecemeal polynomial interpolation with selectable characteristics of the polynomials at the junction points (e.g. continuity and differentiatability of the first derivative and/or continuous second derivative in the case of cubic spline interpolation with third degree or cubic functions).

A parametrization with only one parameter t can, as shown in FIG. 1a, in sections $[P_i, P_{i+1}]$ where modifications to the orientation, the Cartesian position and possibly the auxiliary axes differ widely (e.g. minimum Cartesian modifications with simultaneously a large orientation change), lead to a parameter interval $[t_i, t_{i+1}]$, whose length is not simultaneously favourable for orientation guidance and the Cartesian position. In such cases loops can still occur (FIG. 1a).

Subsequently programmed, marked reorientations can also change, e.g. lengthen the common parameter interval $[t_i, t_{i+1}]$, so that the Cartesian contour changes, which is not acceptable in practice.

When interpolating a given sequence of points Pi through a single, continuous curve, in addition to the "taught" Cartesian positions (X, Y, Z), also the orientations (e.g. represented by means of Euler angles (A, B, C) and corresponding auxiliary axis positions (E1, E2, . . . )) are interpolated and simultaneously the reorientation from point to point is to be minimized. In addition, a pure change to the orientation must not modify the Cartesian curve or auxiliary axis contour and vice versa. Thus, the invention proposes the separate parametrization of all components of Pi, which cannot influence one another. For example, it is possible to separately parametrize the Cartesian position, orientation (independently of a description with Euler angles or quaternions) and the different auxiliary axes, e.g.:

$$Kar(t_i) := (X_i, Y_i, Z_i), i=1, \ldots, n; t_i \in R, t_1 < t_2 < \ldots < t_n$$

$$Orio(o_i) := (A_i, B_i, C_i), i=1, \ldots, n; o_i \in R, o_1 < o_2 < \ldots < o_n, Ek(e_i) := Ek_i, i=1, \ldots, n, k=1, \ldots, m; ek_i \in R, ek_1 < ek_2 < \ldots < ek_n.$$

Figure 1B:
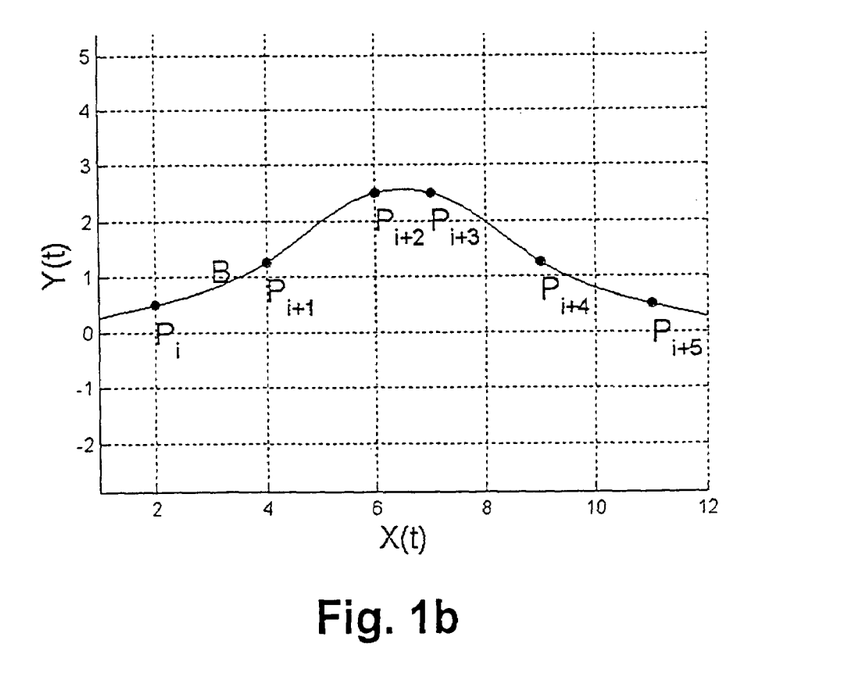
FIG. 1b A path curve according to the invention of a robot movement in two dimensions without loop formation.

Through a monotonically increasing intermediate parametrization o(t) with o(t$_i$)=o$_i$ for all i=1, . . . ,n ek(t) with ek(t$_i$)=ek$_i$ for all i=1, . . . ,n,k=1, . . . ,m the desired interpolation characteristic is guaranteed and a contour shown in FIG. 1*b* is obtained satisfying the desired requirements:

Sp(t)=(Kar(t),Orio(o(t)),E=(e=(t)), . . . ,Em(em(t))).

In order to maintain monotony of the intermediate parametrization for a given order of differentiatability, it is e.g. possible to make use of interpolating splines, which contain an additional parameter by means of which the spline can be forced randomly close to the associated polygonal course (cf. e.g. Helmuth Späth, Spline Algorithms, 4th edition, R. Oldenbourg Verlag 1986, Generalized Cubic Spline Functions).

A pure orientation change in one point consequently only changes the parametrization or intermediate parametrization of the orientation, but not that of the Cartesian path or the auxiliary axes.

Orientation guidance can take place with quaternions or Euler angles.

1. Orientation Guidance with Quaternions

Each reorientation in space can be represented by a rotation about a suitable vector v∈R$^3$ (with |v|=1) and angle φ. Between this pair (vector, angle) and the associated quaternion q, the following link exists:

$$q = (w, x, y, z)$$
$$= (\cos(1/2\varphi), \sin( = /2\varphi) \cdot v$$
$$= (\cos(-1/2\varphi), \sin(-1/2\varphi) \cdot (-v))$$

Thus, a rotation by −v with −φ not only leads to the same orientation, but also to the same quaternion.

However, a rotation by v in the opposite direction, i.e. with −(2π−φ), naturally also leads to the same orientation, but −q is obtained as the associated quaternion (the sign contains the information concerning the rotation direction). Between the pair (rotation vector, angle) and the associated quaternions, the following association consequently exists:

q⇔V,φ),(−v,−φ)

−q⇔(v,−(2π−φ)),(−v,2π−φ).

For the unit quaternions q=(±1, 0, 0, 0) φ=0 or 2π, and due to sin(½φ)=0 the vector v can be chosen at random. For all remaining quaternions on the unit circle it is always possible to determine two pairs (v,φ), (−v,−φ) with φ≠0 or φ≠2π.

On converting into an orientation matrix the quaternion is standardized, i.e. all positive multiples of a quaternion differing from zero lead to the same orientation matrix and rotation direction.

In order to discover an absolutely uniformly parametrized orientation control by means of a quaternion spline, which is always located on the surface of the unit sphere in quaternion space and where the dimension of the orientation spline is reduced by one dimension (from four to three), the invention proposes that for the determination of the spline successively the following steps are performed (hereinafter N is the quantity of the natural numbers and Z the quantity of the whole numbers):

Representation of each quaternion on the four-dimensional unit sphere according to q(α,β,φ)=(cos(½φ), sin(½φ)·v(α,β))

with (v(α,β)=(cos(α) cos(β), sin(α) cos(β), sin(β)), in which α, β, (and r=1) give the spherical coordinates of the rotating vectors v=v(α,β)

determination of motion-optimum pairs (v$_i$,φ$_i$) by
a) adapting the sign of q$_i$, so that q$_{iT}$q$_{i+1}$≧0 for all *i*=1, . . . ,*n*−1;

b) for all i=1, . . . , n determination of a possible pair (v$_i$, φ$_i$) with q$_i$=(cos(½φ$_i$), sin(½φ$_i$)v$_i$);

c) choice of a random starting pair (V$_{iStart}$, φ$_{iStart}$), with iStart∈I:={i=1, . . . , n | q$_i$≠(±1, 0, 0, 0)}, e.g. iStart=min{i∈I};
on choosing iStart∉I, the completely freely selectable rotary vector v$_{iStart}$ would be unnecessarily fixed, which can lead to a suboptimum orientation, because the starting pair would itself no longer be adapted;
d) for all j∈{1, . . . , n} with the exception of j=iStart determination of in each case precisely one pair (v$_j$,φ$_j$ starting from a reference pair (v$_i$,φ$_i$) in accordance with steps e) to g), in which i∈{1, . . . , n) is a neighbouring index, i.e. i=j+1 or i=j−1 and also either i=iStart or the reference pair has already been adapted according to steps e) to g);
e) determination of k*, h*∈Z, so that $$|\varphi_{j,1}(k*) - \varphi_i| = \min\{|\varphi_{j,1}(k) - \varphi_i|, k \in Z\}$$
$$= \min\{|\varphi_j + 4k\pi - \varphi_i|, k \in Z\},$$
$$|\varphi_{j,2}(h*) - \varphi_i| = \min\{|\varphi_{j,2}(h) - \varphi_i|, h \in Z\}$$
$$= \min\{|-\varphi_j + 4h\pi - \varphi_i|, h \in Z\};$$

f) subsequently for j∈I determination of d$_{j,1}$=|arccos(v$_i^T$v$_j$)|+|φ$_{j,1}$(k*)−φ$_i$|, d$_{j,2}$=|arccos(v$_i^T$(−v$_j$))|+|(φ$_{j,2}$(h*)−φ$_i$| or for j∉I d$_{j,1}$=|φ$_{j,1}$(k*)−φ$_i$|, d$_{j,2}$=|φ$_{j,2}$(h*)−φ$_i$|;

g) subsequently in each case choice of (v$_j$, φ$_j$), where for j ∉ I $$(v_j, \varphi_j) = \begin{cases} (v_j, \varphi_{j,1}(k^*)), d_{j,1} \le d_{j,2} \\ (-v_j, \varphi_{j,2}(h^*)), d_{j,1} > d_{j,2} \end{cases}$$

or for j ∉ I $$(v_j, \varphi_j) = \begin{cases} (v_i, \varphi_{j,1}(k^*)), \text{if } d_{j,1} \le d_{j,2} \\ (v_i, \varphi_{j,2}(h^*)), \text{if } d_{j,1} > d_{j,2}; \end{cases}$$

v$_j$ can be in principle randomly selected for j∉I. The specific choice (v$_j$=v$_i$) is only provisional (until all (v$_j$, φ$_j$) are adapted) and guarantees that in step d) there is always a complete reference pair and the freely selectable rotary vectors are ignored (i.e. skipped), so that finally there is always a minimization of the spacing between neighbouring, not freely selectable rotary vectors.

When all the pairs $(v_i, \phi_i)$ are adapted according to steps e) to g), the freely selectable $v_i$ (with $i \in I$) are no longer required and can be deleted or cancelled;

determination of pairs $(\alpha_i, \beta_i)$ from $v_i$ in spherical coordinate representation by:

h) determining standard spherical coordinates $(\alpha_i, \beta_i)$ of $v_i$ for all $i \in I$:

$$v_i = (\cos(\alpha_i)\cos(\beta_i), \sin(\alpha_i)\cos(\beta_i), \sin(\beta_i));$$

i) definitions of $$J := \{j \in I \text{ with } v_j \neq (0,0,\pm 1)\},$$

$$L := \{j \in I \text{ with } v_j = (0,0,\pm 1)\}$$

and therefore definition of expanded spherical coordinates from R×R
for $i \in J$:

$$(\alpha_{i,1}(h), \beta_{i,1}(k)) = (\alpha_i + 2h\pi, \beta_i + 2k\pi), h, k \in Z;$$

$$(\alpha_{i,2}(l), \beta_{i,2}(m)) = (\alpha_i + \pi + 2l\pi, \pi - \beta_i + 2m\pi), l, m \in Z;$$

for $i \in L$:

$$(\alpha_i(x), \beta_i(k)) = (x, \beta_i + 2k\pi), x \in R, k \in Z$$

(as $\beta_i = \pm\pi/2$ for $i \in L$, supplies $(\alpha_i(x) + \pi, \pi - \beta_i(k))$ no further solutions);

j) fixing a random starting pair $(\alpha_{iStart}, \beta_{iStart})$ with jStart $\in J$, e.g. jStart = min $\{j \in J\}$ (jStart $\in L$ would be unfavourable, because the freely selectable parameter $\alpha_j$ would then be fixed beforehand, which would lead to a suboptimum solution);

k) for all $j \in I$ with the exception of j=jStart in each case determination of expanded polar coordinates in accordance with steps l) and m), in which $i \in I$ is an adjacent index of j, so that there is no $k \in I$ between i and j and also either i=jStart or the reference pair $(\alpha_i, \beta_i)$ has already been adapted according to steps l) and m));

l) determination of $j \in J$ of values h*, k*, l*, m*$\in Z$ with $$d_{j,1} = \min\{|\alpha_{j,1}(h) - \alpha_i| + |\beta_{j,1}(k) - \beta_i|, \text{ with } h, k \in Z\}$$
$$= |\alpha_{j,1}(h^*) - \alpha_i| + |\beta_{j,1}(k^*) - \beta_i|;$$

$$d_{j,2} = \min\{|\alpha_{j,2}(l) - \alpha_i| + |\beta_{j,2}(m) - \beta_i|, \text{ with } l, m \in Z\}$$
$$= |\alpha_{j,2}(l^*) - \alpha_i| + |\beta_{j,2}(m^*) - \beta_i|$$

or for $j \in L$ of a value $k^* \in Z$ with $$|\beta_j(k^*) - \beta_i| = \min\{|\beta_j(k) - \beta_i|, k \in Z\};$$

m) subsequently choice of $(\alpha_j, \beta_j)$, in which for $j \in J$ $$(\alpha_j, \beta_j) = \begin{cases} (\alpha_{j,1}(h^*), \beta_{j,1}(k^*)), & d_{j,1} \leq d_{j,2} \\ (\alpha_{j,2}(l^*), \beta_{j,2}(m^*)), & d_{j,1} > d_{j,2} \end{cases}$$

or for $j \in L$ $$(\alpha_j, \beta_j) = (\alpha_i, \beta_j(k^*));$$

for $j \in L$, $\alpha_j$ is in principle randomly selectable.

The specific choice $(\alpha_j = \alpha_i)$ is only provisional (until all $(\alpha_j, \beta_j)$ are adapted) and guarantees that in step l) there is always a complete reference pair and that freely selectable $\alpha$ angles are ignored (i.e. skipped), so that the spacing from one $\alpha$ angle to the next (adjacent) not freely selectable $\alpha$ angle is minimized.

When all the pairs $(\alpha_j, \beta_j)$ are adapted according to steps l) and m), the freely selectable $\alpha_j$ (with $j \in L$) are no longer required and can be deleted;

n) choice of a number of triples determined according to steps a) to m)

$$(\alpha_i, \beta_i, \varphi_i) = \begin{cases} \{(\alpha_i, \beta_i, \varphi_i) \text{ for } i \in J \\ \{(*, \beta_i, \varphi_i) \text{ for } i \in L \\ \{(*, *, \varphi_i) \text{ for } i \in I, \end{cases}$$

in which the components designated with * are randomly selectable;

o) adapting the selectable components in the triples $(\alpha_i, \beta_i, \phi_i)$;

interpolation of the triples $(\alpha_i, \beta_i, \phi_i)$ selected in step n) by a spline and—using the interpolation function in $q(\alpha, \beta, \phi)$.

Interpolated path curves for robot movements determined in this way more particularly avoid the undesired loop formation shown in FIG. 1a, even in the case of subsequent changes to individual components of motion, such as the orientation in space, because such motion components have, according to the invention, their own parametrization in each case, which can be adapted without any negative effects on the other components of motion.

The adaptation of the freely selectable components of $(\alpha_i, \beta_i, \phi_i)$ takes place according to a further development of the above algorithm using:

iMin := min $\{i \in I\}$
iMax := max $\{i \in I\}$
jMin := min $\{j \in J\}$
jMax := max $\{j \in J\}$, so that $$\alpha_p = \begin{cases} \alpha_{j\text{Min}} & \text{for } 1 \leq p < j\text{Min}, \\ \alpha_{j\text{Max}} & \text{for } j\text{Max} < p \leq n \end{cases}$$

and $$\beta_p = \begin{cases} \beta_{i\text{Min}} & \text{for } 1 \leq p < i\text{Min}, \\ \beta_{i\text{Max}} & \text{for } i\text{Max} < p \leq n. \end{cases}$$

It is also possible to select for adjacent i, $j \in J$ for all $i < p < j$, i.e. $p \in J$ $$\alpha_p = \alpha_i + (p-i)/(j-i) \cdot (\alpha_j - \alpha_i)$$

and correspondingly for adjacent i, $j \in I$ for all $i < p < j$, i.e. $p \in I$ $$\beta_p = \beta_i + (p-i)/(j-i) \cdot (\beta_j - \beta_i).$$

Figure 5:
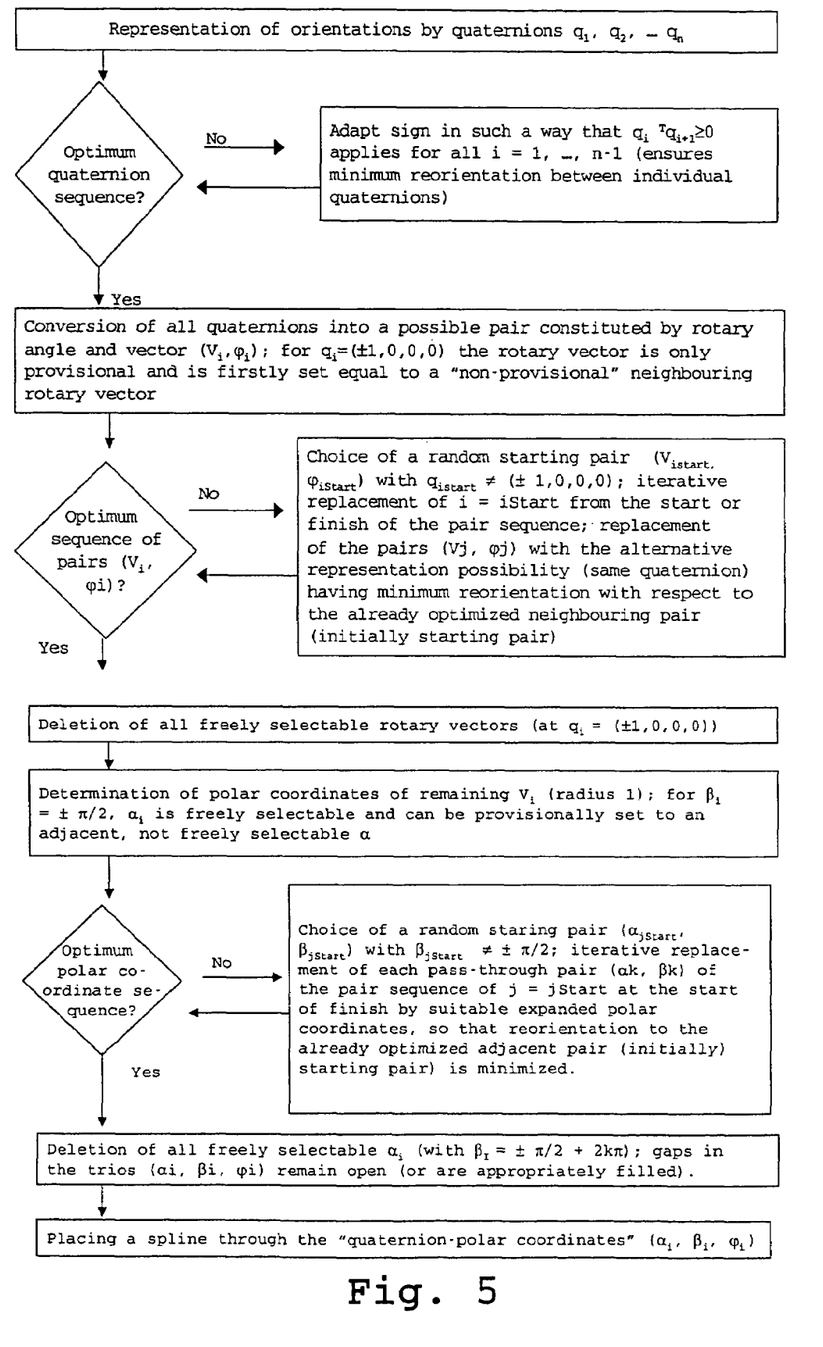
FIG. 5 A flow chart of a method according to the invention when using the quaternion algorithm.

The quaternion-based motion control according to the invention is compactly shown in the following table 1 and in FIG. 5 by means of a flow chart.

TABLE 1

Quaternion algorithm

| Action | | | Calculate orientation with rotary vectors and angles | | | |
|---|---|---|---|---|---|---|
| Calculate quaternions adapt sign | $q_1$ | $q_2 = (1, 0, 0, 0)$ | $q_3$ | ... | $q_{n-1}$ | $q_n = (-1, 0, 0, 0)$ |
| Calculate rotary vectors/ angles | $(\bar{v}_1, \bar{\phi}_1)$ | $(\bar{v}_2, \bar{\phi}_2)$ with $\bar{v}_2 = \bar{v}_1$ | $(\bar{v}_3, \bar{\phi}_3)$ | ... | $(\bar{v}_{n-1}, \bar{\phi}_{n-1})$ | $(\bar{v}_n, \bar{\phi}_n)$ with $\bar{v}_n = \bar{v}_{n-1}$ |
| Minimize changes between pairs | $(v_1, \phi_1)$ | $(v_2, \phi_2)$ | $(v_3, \phi_3)$ | ... | $(v_{n-1}, \phi_{n-1})$ | $(v_n, \phi_n)$ |
| Delete freely selectable $v_i$ | $(v_1, \phi_1)$ | $(*, \phi_2)$ | $(v_3, \phi_3)$ | ... | $(v_{n-1}, \phi_{n-1})$ | $(*, \phi_n)$ |

| Action | | | Calculate expanded polar coordinates for rotary vectors | | | |
|---|---|---|---|---|---|---|
| Consider rotary vectors | $v_1 = (0, 0, -1)$ | * | $v_3$ | ... | $v_{n-1} = (0, 0, 1)$ | * |
| Calculate polar coordinates | $(\bar{\alpha}_1, \bar{\beta}_1)$ with $\bar{\alpha}_1 = \bar{\alpha}_3$ | (*, *) | $(\bar{\alpha}_3, \bar{\beta}_3)$ | ... | $(\bar{\alpha}_{n-1}, \bar{\beta}_{n-1})$ with $\bar{\alpha}_{n-1} = \bar{\alpha}_{n-2}$ | (*, *) |
| Calculate expanded polar coordinates | $(\alpha_1, \beta_1)$ | (*, *) | $(\alpha_3, \beta_3)$ | ... | $(\alpha_{n-1}, \beta_{n-1})$ | (*, *) |
| Delete freely selectable $\alpha_i$ | $(*, \beta_1)$ | (*, *) | $(\alpha_3, \beta_3)$ | ... | $(*, \beta_{n-1})$ | (*, *) |

| Action | | | Represent orientation with "quaternion-polar coordinates" | | | |
|---|---|---|---|---|---|---|
| Calculate three-dimensional splines by | $(*, \beta_1, \phi_1)$ | $(*, *, \phi_2)$ | $(\alpha_3, \beta_3, \phi_3)$ | ... | $(*, \beta_{n-1}, \phi_{n-1})$ | $(*, *, \phi_n)$ |

2. Orientation Control or Guidance with Euler Angles

Whilst by definition the "classic" Euler angles are restricted to a part of $R^3$ with $[-\pi,\pi] \times [-\pi/2,\pi/2] \times [-\pi,\pi]$, according to the invention all Euler angle restrictions are dropped. Among all the possible variants of the orientation representation with "expanded Euler angles" from $R \times R \times R$ ($R^3$) those leading to the minimum reorientations are sought.

On successively performing three rotations by angles A, B and C, rotating in each case about an axis in the jointly rotated system, said angles are referred to as Euler angles. Independently of the sequence of the axes about which rotation takes place, for each orientation there are twelve different types of Euler angles, e.g. X-Y-Z Euler angles, X-Y-X Euler angles, etc.

If A, B and C are e.g. Z-Y-X Euler angles, then the total rotation R is obtained from $$R = \text{rot}(z,A) \cdot \text{Rot}(y,B) \cdot \text{Rot}(x,C),$$

in which Rot(v,ω) designates a rotation about v with angle ω.

The following considerations can be transferred to all Euler angle types. Thus, without restriction, there can be a limitation to Z-Y-X Euler angles. In this case, the target orientation is obtained from the starting orientation (reference system I), in that
  in reference system I rotation takes place about the Z axis with A (result: reference system I');
  in the once-primed reference system I' rotation takes place about the y' axis with B (result: reference system I''):
  in the twice-primed reference system I'' rotation about the x'' axis with C (result: target orientation R).

Figure 2A:
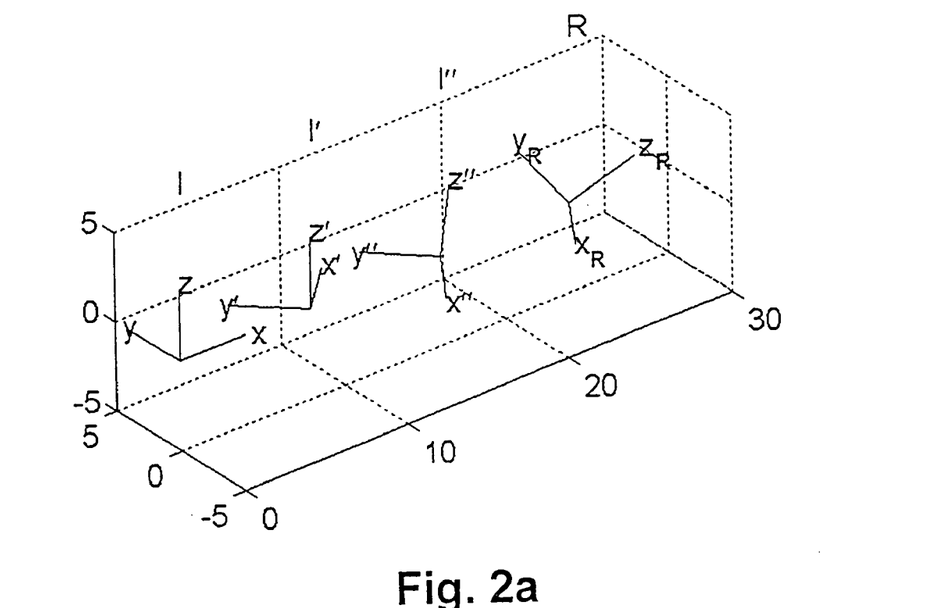
FIG. 2a A rotation in the description with Euler angles.

This is shown in exemplified manner in FIG. 2a for Z-Y-X Euler angles. Firstly the reference system I is transformed by a rotation with A=π/4 about the Z axis (positive counter-clockwise rotation direction) is transformed into the reference system I'. Subsequently by rotation about the newly defined y' axis with B=π/3, the reference system I' is transformed into a new reference system I''. Finally, by rotating about the axis x'' with C=π/4, this passes into the desired target orientation.

On considering only the x'' axis in the reference system I'' (or in the case of target orientation), the angles A and B clearly represent the spherical coordinates thereof with respect to the starting orientation. The same x'' is obtained with the angle pair (A+π,π−B).

Figure 2B:
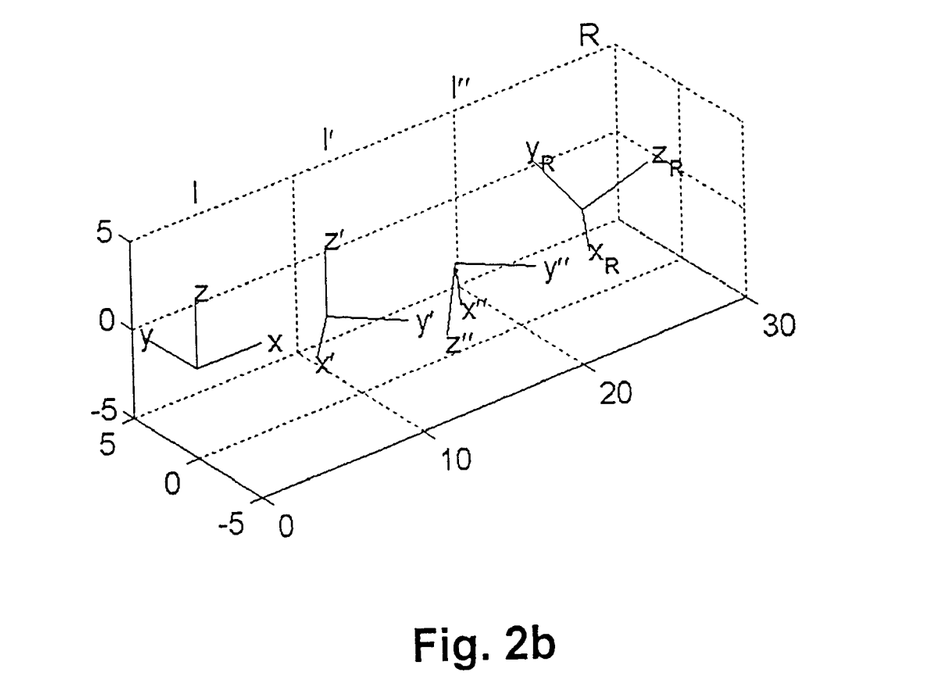
FIG. 2b The rotation according to FIG. 2a in a different description with Euler angles.

However, in this case y'' and z'' are rotated by an angle π with respect to the case with (A, B, C). Thus, the same target orientation is obtained when using Euler angles (A+π,π−B, C+π). Thus, in the preceding example, in place of (π/4, π/3, π/4), the trio (5/4π, 2/3π, 5/4π). This is shown in FIG. 2b.

According to the invention, such an Euler angle adaptation is brought about in that for minimum reorientation successively the following steps are performed and without restriction of the general nature, the Euler angles A,B,C indicate rotations about the instantaneous z axis, y axis or x axis:

Representation of the orientations ($A_i$, $B_i$, $C_i$) by:
a) determination of standard Euler angles ($A_i$, $B_i$, $C_i$),
b) for I:={i=1, ..., n|$B_i \neq \pm \pi/2 + 2k\pi$, k∈Z} and i∈I definition of $$(A_{i,1}(g), B_{i,1}(h), C_{i,1}(k)) = (A_i + 2g\pi, B_i + 2h\pi, C_i + 2k\pi), g,h,k \in Z; \text{ and}$$

$$(A_{i,2}(l), B_{i,2}(m), C_{i,2}(o)) = (A_i + \pi + 2l\pi, \pi - B_i + 2m\pi, C_i + \pi + 2o\pi), l,m,o \in Z;$$

c) for J:={i=1, ..., n|$B_i$=π/2+2kπ, k∈Z} and i∈J definition of $$(A_i(t), B_i(h), C_i(k,t)) = (A_i+t, B_i+2hπ, C_i+t+2kπ), t∈R, h, k∈Z$$

(for i∈J the alternative representation ($A_i(t)$+π, π−$B_i$(h), $C_i$(k, t)+π) supplies no new solutions);

d) for L:={i=1, ..., n|$B_i$=−π/2+2kπ, k∈Z} and i∈L definition of $$(A_i(t), B_i(h), C_i(k,t)) = (A_i+t, B_i+2hπ, C_i−t+2kπ), t∈R, h, k∈Z$$

(for i∈L the representation ($A_i(t)$+π, π−$B_i$(h), $C_i$(k, t)+π) supplies no new solutions);

e) choice of a random starting pair ($A_{iStart}$, $B_{iStart}$, $C_{iStart}$) with iStart∈I, e.g. iStart=min {i∈I}; iStart∈J∪L would give a suboptimum orientation control, because the starting pair is itself no longer adapted and therefore the parameter t freely selectable for iStart∈J∪L would have to be predetermined in fixed form;

f) for all j∈{1, ..., n} apart from j=iStart determination of expanded Euler angles ($A_j$, $B_j$, $C_j$) according to steps g) and h), where i∈{1, ..., n} is an adjacent index, i.e. i=j+1 or i=j−1 and additionally either i=iStart or a reference pair ($A_i$, $B_i$, $C_i$) has already been adapted according to steps g) and h):

g) for j∈I determination of $$d_{j,1} = \min\{|A_{j,1}(g)−A_i|+|B_{j,1}(h)−B_i|+|C_{j,1}(k)−C_i|, g, h, k∈Z\};$$

$$d_{j,2} = \min\{|A_{j,2}(l)−A_i|+|B_{j,2}(m)−B_i|+|C_{j,2}(o)−C_i|, l, m, o∈Z\};$$

assuming the minimum for g*, h*, k* or l*, m*, o*; and choice of $$(A_j, B_j, C_j) = \begin{cases} \{(A_{j,1}(g^*), B_{j,1}(h^*), C_{j,1}(k^*)), & \text{if } d_{j,1} \leq d_{j,2} \\ \{(A_{j,2}(l^*), B_{j,2}(m^*), C_{j,2}(o^*)), & \text{if } d_{j,1} > d_{j,2}; \end{cases}$$

h) for j∈J or j∈L definition of $$dA_j(t) := |A_j(t)−A_i|$$

$$dB_j(h) := |B_j(h)−B_i|$$

$$dC_j(k,t) := |C_j(k,t)−C_i|$$

with h, k∈Z and t∈R;
determination of h*∈Z with $dB_j(h^*)$=min{$dB_j(h)$, h∈Z};
calculation of zero points of $dA_j(t)$ or $dC_j(k, t)$ with respect to t, in which $ta_{0,j}$ is the zero point of $dA_j(t)$ and $tc_{0,j}(k)$ is the zero point of $dC_j(k, t)$ dependent on the parameter k; choice of k*∈Z, so that there is a minimum spacing of the zero points, i.e.

$$|ta_{0,j}−tc_{0,j}(k^*)| = \min\{|ta_{0,j}−tc_{0,j}(k)|, k∈Z\};$$

choice of t* random between $ta_{0,j}$ and $tc_{0,j}(k^*)$, because there is always fulfilment there of $$dA_j(t^*)+dB_j(h^*)+dC_j(k^*,t^*) = \min\{dA_j(t)+dB_j(h)+dC_j(k,t), t∈R, h, k∈Z\}$$

and choice of $$(A_j, B_j, C_j) = (A_j(t^*), B_j(h^*), C_j(k^*,t^*));$$

interpolation of the triple ($A_i$, $B_i$, $C_i$) by a spline and use of the interpolation function in the rotation matrix R(A, B, C).

According to a preferred development of the above-described algorithm, the parameter t* is chosen according to t*=½($ta_{0,j}$+$tc_{0,j}$(k*)). This leads to equal amount orientation changes in the A and C angles.

Figure 3:
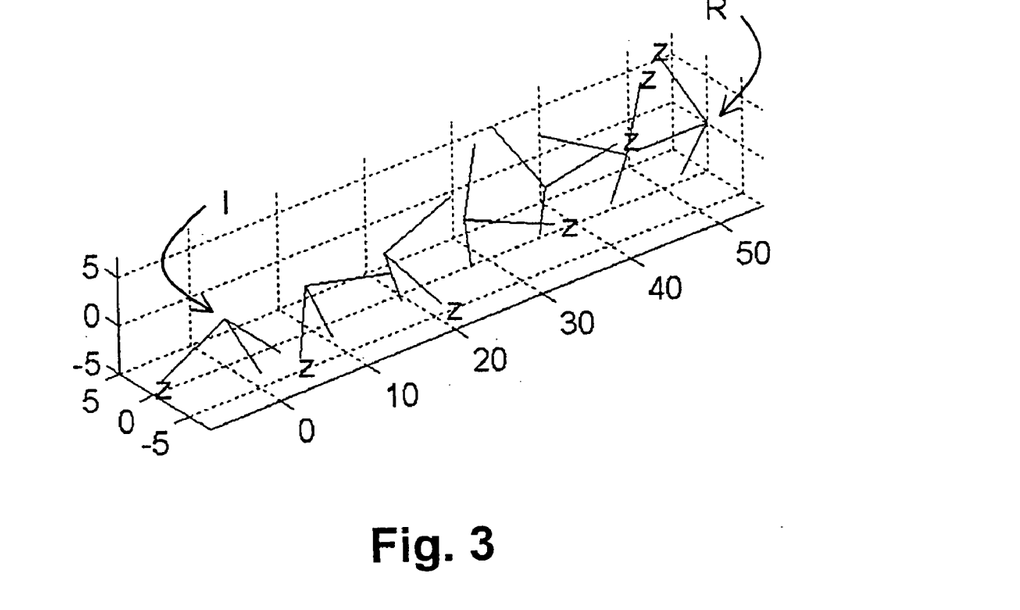
FIG. 3 A rotation movement in the representation with standard Euler angles.
Figure 4:
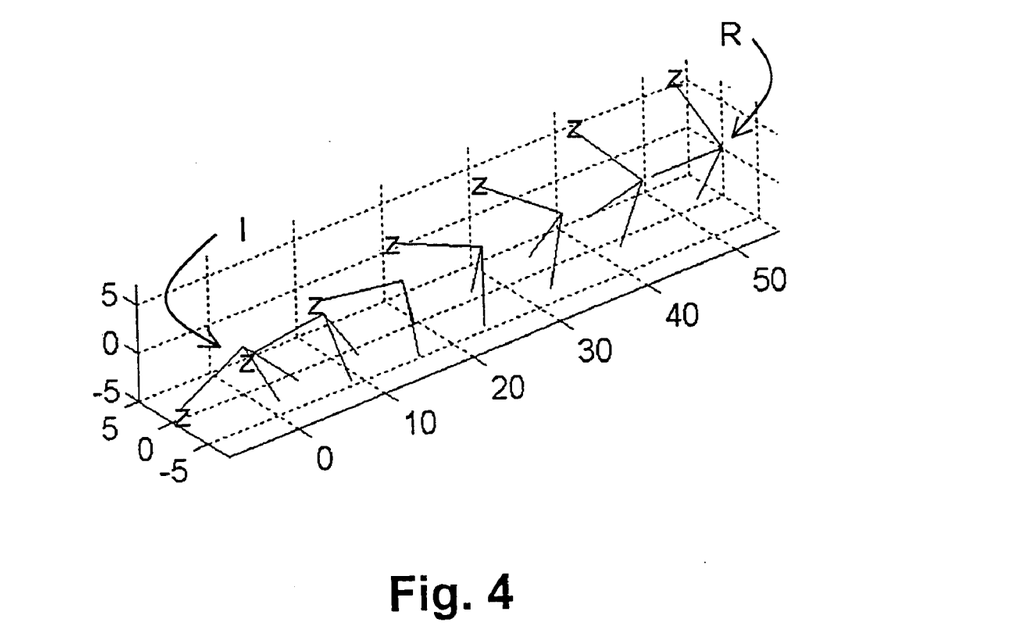
FIG. 4 A representation of the rotation of FIG. 3 with extended or expanded Euler angles.

The advantage of the above-described algorithm for the determination of expanded Euler angles is illustrated by the following example shown in FIGS. 3 and 4:

There are two triples of Z-Y-X Euler angles $$(A_0, B_0, C_0) = (0, π/2−½, π)$$

$$(A_1, B_1, C_1) = (π/2, π/2−½, 0).$$

If these values are guided linearly into one another, i.e. by linear interpolation, then for the associated coordinate rotations there is a configuration as shown in FIG. 3.

FIG. 3 shows how the initial reference system I is transformed by linear interpolation of the angular overall change for each coordinate axis into a target orientation R. As a result of the limitation of the value range for classic Euler angles, in certain circumstances there are undulating movements for individual coordinate axes, as is apparent in FIG. 3 relative to the movement of coordinate axis Z. In the lower area of FIG. 3 reaches the boundary of its definition range and then returns to the smaller value range, which brings about said undulation, which in the same way as the loop formation according to FIG. 1a, represents an uneconomic form of orientation control for robots and which must therefore be avoided.

If instead (starting from the initial orientation) determination takes place of the adapted Euler trio, then we obtain:

$$(−π/2, π/2+½, π) = (A_1+π−2π, π−B, C_1+π).$$

As shown in FIG. 4, the associated rotation matrixes consequently pass into one another over the intuitively shortest path, so that the robot movement follows a much more economic course, which has a positive effect regarding the duration and space requirement for manipulation processes. Characteristic undulations are avoided, unlike in the case of FIG. 3.

Figure 6:
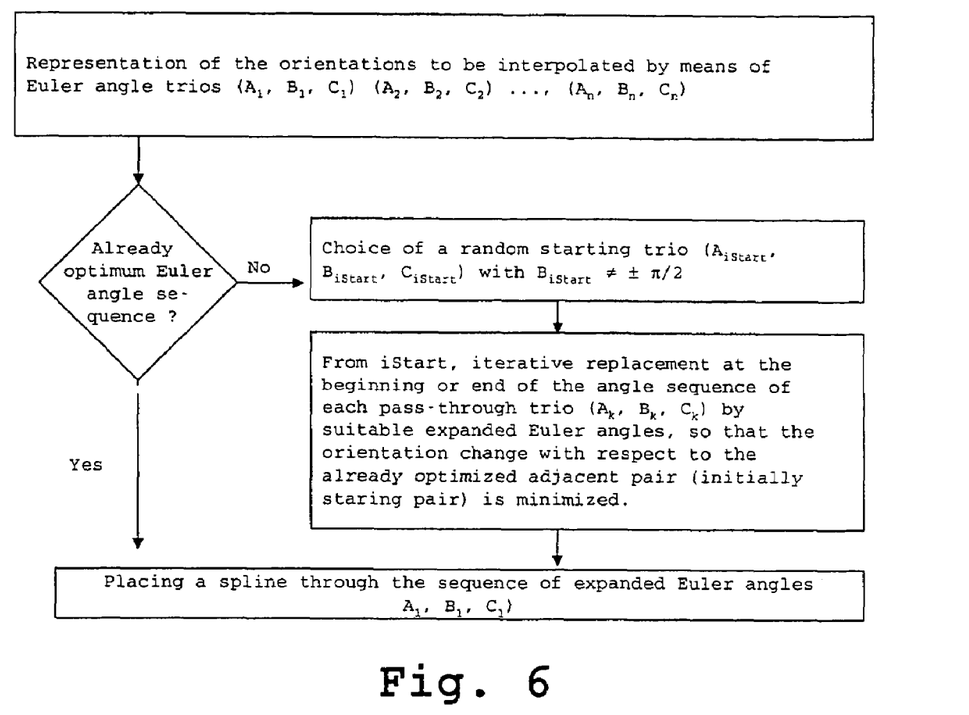
FIG. 6 A flow chart of an inventive method when using the Euler angle algorithm.

The movement control by means of expanded Euler angles according to the invention is illustrated in table 2 and FIG. 6 by means of a flow chart and in compact form.

TABLE 2

Algorithm with expanded Euler angles

| Action | | | | | |
|---|---|---|---|---|---|
| | Determine expanded Euler angles | | | | |
| Calculate standard Euler angles | ($\bar{A}_1$, $\bar{B}_1$, $\bar{C}_1$) | ($\bar{A}_2$, $\bar{B}_2$, $\bar{C}_2$) | ... | ($\bar{A}_{n−1}$, $\bar{B}_{n−1}$, $\bar{C}_{n−1}$) | ($\bar{A}_n$, $\bar{B}_n$, $\bar{C}_n$) |
| | $\bar{B}_1$ = π/2 | | | $\bar{B}_{n−1}$ = −π/2 | |

TABLE 2-continued

Algorithm with expanded Euler angles

Action

| Determine expanded Euler angles from iStart | $(A_1, B_1, C_1)$ ← | $(A_2, B_2, C_2)$ <br> = $(A_{iStart},$ <br> $B_{iStart}, C_{iStart})$ | ... | $(A_{n-1}, B_{n-1}, C_{n-1})$ → | $(A_n, B_n, C_n)$ |

Represent orientation with expanded Euler angles.

| Calculate three-dimensional spline by | $(A_1, B_1, C_1)$ | $(A_2, B_2, C_2)$ | ... | $(A_{n-1}, B_{n-1}, C_{n-1})$ | $(A_n, B_n, C_n)$ |

Figure 7:
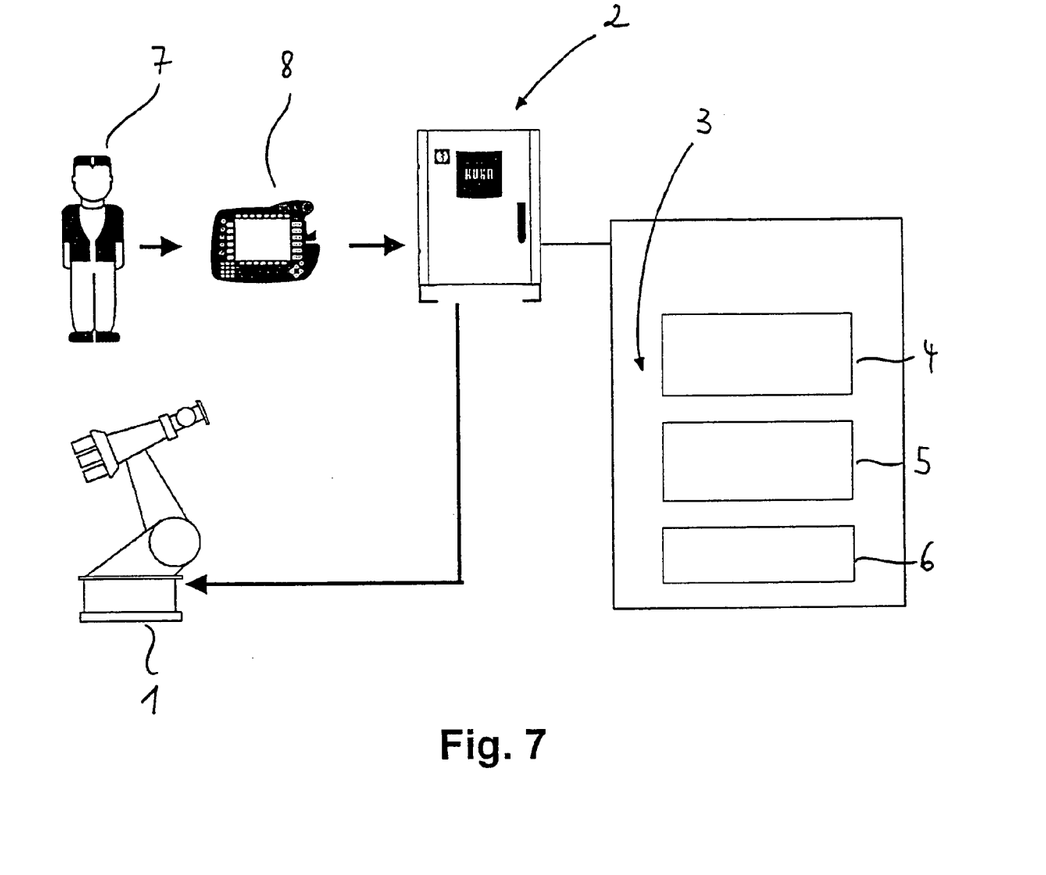
FIG. 7 A block diagram of the device according to the invention.

By means of a block diagram, FIG. 7 shows a possible development of a device according to the invention and which is suitable for controlling the movements of a manipulator in accordance with the above-described method. A manipulator is shown in the form of an industrial robot 1 having an associated control means 2, which according to the invention in particular has computing means 3, which are set up in the form of a compiler/interpreter 4 and interpolation unit and through which the aforementioned algorithms for movement control can be implemented from the control standpoint in that the computing means 3 act within the control means 2 on drive means 6 of robot 1. By means of a manually operable control unit 8, an operator 7 can act on the sequences in the control means 2, specifically in the computing means 3, e.g. by a subsequent programming of reorientations of robot 1.

The invention claimed is:

1. A method for orientation control of a robotal device, the method comprising:
    interpolating given dot sequences of poses by splines, and representing the orientation represented by Eulerian angles $A_1, B_1, C_1 \in R$ expanded in the entire quantity of real numbers $R^3$, wherein components of the motion are separately parametrized;
    orienting the robotal device based on said Eulerian angles.

2. Method according to claim 1, wherein positions of the manipulator are parameterized separately from the orientations thereof.

3. Method according to claim 1, wherein movements of auxiliary axes are parameterized separately from the positions and/or orientations of the manipulator.

4. Method according to claim 1, wherein an orientation control takes place by means of successive rotations through Euler angles $A_i, B_i, C_i, i=1, \ldots, n$, and in each case directly succeeding rotations take place about axes perpendicular to one another.

5. Method according to claim 1, wherein for minimum reorientation successively the following steps are performed and the Euler angles A, B and C, without restricting the general nature, indicate rotations about the instantaneous z axis, y axis or x axis:
    representation of the orientations $(A_i, B_i, C_i)$ by:
    a) determination of standard Euler angles $(A_i, B_i, C_i)$,
    b) for $I:=\{i=1, \ldots, n | B_i \neq \pi/2+2k\pi, k \in Z\}$ and $i \in I$ definition of $(A_{i,1}(g), B_{i,1}(h), C_{i,1}(k)) = (A_i+2g\pi, B_i+2h\pi, C_i+2k\pi), g,h, k \in Z;$ and $(A_{i,2}(l), B_{i,2}(m), C_{i,2}(o)) = (A_i+2l\pi, \pi-B_i+2m\pi, C_i+\pi+2o\pi), l,m,o \in Z;$ c) for $J:=\{i=1, \ldots, n | B_i = \pi/2+2k\pi, k \in Z\}$ and $i \in J$ definition of $(A_i(t), B_i(h), C_i(k,t)) = (A_i+t, B_i 2h\pi, C_i+t+2k\pi), t \in R, h, k \in Z$ d) for $L:=\{i=1, \ldots, n | B_i = -\pi/2+2k\pi, k \in Z\}$ and $i \in L$ definition of $(A_i(t), B_i(h), C_i(k,t)) = (A_i+t, B_i 2h\pi, C_i-t+2k\pi), t \in R, h, k \in Z$ e) choice of a random starting pair $(A_{iStart}, B_{iStart}, C_{iStart})$ with $iStart \in I$, e.g. $iStart = \min \{i \in I\}$;

f) for all $j \in \{1, \ldots, n\}$ apart from $j=iStart$ determination of expanded Euler angles $(A_j, B_j, C_j)$ according to steps g) and h), where $i \in \{1, \ldots, n\}$ is an adjacent index, i.e. $i=j+1$ or $i=j-1$ and additionally either $i=iStart$ or a reference pair $(A_i, B_i, C_i)$ has already been adapted according to steps g) and h):

g) for $j \in I$ determination of $d_{j,1} = \min\{|A_{j,1}(g) - A_i| + |B_{j,1}(h) - B_i| + |C_{j,1}(k) - C_i|, g, h, k \in Z\}$ $d_{j,2} = \min\{|A_{j,2}(l) - A_i| + |B_{j,2}(m) - B_i| + |C_{j,2}(o) - C_i|, l, m, o \in Z\}$ assuming the minimum for $g^*, h^*, k^*$ or $l^*, m^*, o^*$; and choice of $(A_j, B_j, C_j) = \begin{cases} \{(A_{j,1}(g^*), B_{j,1}(h^*), C_{j,1}(k^*)), \\ \text{if } d_{j,1} \leq d_{j,2} \\ \{(A_{j,2}(l^*), B_{j,2}(m^*), C_{j,2}(o^*)), \\ \text{if } d_{j,1} > d_{j,2}; \end{cases}$ h) for $j \in J$ or $j \in L$ definition of $dA_j(t) := |A_j(t) - A_i|$ $dB_j(h) := |B_j(h) - B_i|$ $dC_j(k,t) := |C_j(k,t) - C_i|$ with $h, k \in Z$ and $t \in R$;
    determination of $h^* \in Z$ with $dB_j(h^*) = \min\{dB_j(h), h \in Z\}$;
    calculation of zero points of $dA_j(t)$ or $dC_j(k, t)$ with respect to t, in which $ta_{0,j}$ is the zero point of $dA_j(t)$ and $tc_{0,j}(k)$ is the zero point of $dC_j(k, t)$ dependent on the parameter k;

choice of k*∈Z, so that there is a minimum spacing of the zero points , i.e.

$$|ta_{0,j}-tc_{0,j}(k^*)|=\min\{|ta_{0,j}-tc_{0,j}(k)|, k\in Z\};$$

choice of t* random between $ta_{0,j}$ and $tc_{0,j}(k^*)$, because there is always fulfilment there of $$dA_j(t^*)=dB_j(h^*)=dC_j(k^*,t^*)=\min\{dA_j(t)=dB_j(h)=dC_j(k,t), t\in R, h, k\in Z\}$$

and choice of $$(A_j, B_j, C_j)=(A_j(t^*), B_j(h^*), C_j(k^*,t^*));$$

interpolation of the triple $(A_i, B_i, C_i)$ by a spline and use of the interpolation function in the rotation matrix $R(A, B, C)$.

6. Method according to claim 5, wherein $t^*=\frac{1}{2}(ta_{0,j}+tc_{0,j}(k^*))$ is chosen.

7. A method for orientation control of a robotal device, the method comprising:

orienting the robotal device based on quaternions (qi, i=1, . . . , ), wherein for minimum reorientation between individual points successively the following steps are performed:

representation of each quaternion on the four-dimensional unit sphere according to $$q(\alpha,\beta,\phi)=(\cos \tfrac{1}{2}\phi, \sin(\tfrac{1}{2}\phi)\cdot v(\alpha,\beta))$$

with $$(v(\alpha,\beta)=(\cos(\alpha)\cos(\beta), \sin(\alpha)\cos(\beta), \sin(\beta)),$$

in which α, β, (and r=1) give the spherical coordinates of the rotating vectors $v=v(\alpha, \beta)$ determination of motion-optimum pairs $(v_i, \phi_i)$ by a) adapting the sign of $q_i$, so that $$q_i^T q_{i+1} \geq 0 \text{ for all } i=1,\ldots,n-1; \ b) \text{ for all } i=1,$$

b) for all i=1. . . , n determination of a possible pair $(v_i, \phi_i)$ with $$q_i=(\cos(\tfrac{1}{2}\phi_i), \sin(\tfrac{1}{2}\phi_i)v_i);$$

c) choice of a random starting pair $(V_{iStart}, \phi_{istart})$ with $iStart\in I:=\{i=1,\ldots,n|q_i\neq(\pm 1, 0, 0, 0)\}$, e.g. iStart=min{∈I};

on choosing iStart∈I, the completely freely selectable rotary vector $V_{iStart}$ would be unnecessarily fixed, which can lead to a suboptimum orientation, because the starting pair would itself no longer be adapted;

d) for all j∈(1, . . . , n} with the exception of j=iStart determination of in each case precisely one pair $(v_j, \phi_j)$ starting from a reference pair $(v_i, \phi_i)$ in accordance with steps e) to g), in which i∈(1, . . . , n) is a neighbouring index, i.e. i=j+1 or i=j−1 and also either i=iStart or the reference pair has already been adapted according to steps e) to g);

e) determination of k*, h*∈Z, so that $$|\varphi_{j,1}(k^*) - \varphi_i| = \min\{|\varphi_{j,1}(k) - \varphi_i|, k \in Z\}$$

$$= \min\{|\varphi_j + 4k\pi - \varphi_i|, k \in Z\},$$

$$|\varphi_{j,2}(h^*) - \varphi_i| = \min\{|\varphi_{j,2}(h) - \varphi_i|, h \in Z\}$$

$$= \min\{|-\varphi_j + 4h\pi - \varphi_i|, h \in Z\};$$

f) subsequently for j∈I determination of $$d_{j,1}=|\arccos(v_i^T v_j)|+|\phi_{j,1}(k^*)-\phi_i|,$$

$$d_{j,2}=|\arccos(v_i^T(-v_j))|=|\phi_{j,2}(h^*)-\phi_i|$$

or for j∉

$$d_{j,1}=|\phi_{j,1}(k^*)-\phi_i|,$$

$$d_{j,2}=|\phi_{j,2}(h^*)-\phi_i|;$$

g) subsequently in each case choice of $(v_j, \phi_j)$ where for j ∈ I $$(v_j, \varphi_j) = \begin{cases} (v_j, \varphi_{j,1}(k^*)), & d_{j,1} \leq d_{j,2} \\ (-v_j, \varphi_{j,2}(h^*)), & d_{j,1} > d_{j,2} \end{cases}$$

or for j ∈ I $$(v_j, \varphi_j) = \begin{cases} (v_i, \varphi_{j,1}(k^*)), & \text{if } d_{j,1} \leq d_{j,2} \\ (v_i, \varphi_{j,2}(h^*)), & \text{if } d_{j,1} > d_{j,2}; \end{cases}$$

determination of pairs $(\alpha_i, \beta_i)$ from $v_i$ in spherical coordinate representation by h) calculation of standard spherical coordinates $(\alpha_i, \beta_i)$ of $v_i$ for all i∈I:

$$v_i=(\cos(\alpha_1)\cos(\beta_i), \sin(\alpha_1)\cos(\beta_i), \sin(\beta_i))$$

i) definition of $$J:=\{j \in I \text{ with } v_j\neq(0,0,\pm 1)\}$$

$$L:=\{j \in I \text{ with } v_j=(0,0,\pm 1)\}$$

and therefore definition of expanded spherical coordinates from R×R for i∈J:

$$(\alpha_{i,1}(h),\beta_{i,1}(k))=(\alpha_i+2h\pi,\beta_i+2k\pi), h, k\in Z;$$

$$(\alpha_{i,2}(l),\beta_{i,2}(m))=(\alpha_i+\pi 2l\pi,\pi-\beta i 30\ 2m\pi), l, m\in Z;$$

for i∈L:

$$(\alpha_i(x),\beta_i(k))=(x, B_i 2k\pi), x\in R, k\in Z;$$

j) fixing a random starting pair $(\alpha_{jStart}, \beta_{jStart})$ with jStart∈J;

k) for all j∈I with the exception of j=jStart in each case determination of expanded polar coordinates in accordance with steps l) and m), in which i∈I is an adjacent index of j, so that there is no k∈I between i and j and also either i=jStart or the reference pair $(\alpha_i, \beta_i)$ has already been adapted in accordance with steps l) and m):

l) determination of j∈J of values h*, k*, l*, m*∈Z with $$d_{j,1} = \min\{|\alpha_{j,1}(h) - \alpha_i| + |\beta_{j,1}(k) - \beta_i|, \text{ with } h, k \in Z\}$$

$$= |\alpha_{j,1}(h^*) - \alpha_i| + |\beta_{j,1}(k^*) - \beta_i|;$$

$$d_{j,2} = \min\{|\alpha_{j,2}(l) - \alpha_i| + |\beta_{j,2}(m) - \beta_i|, \text{ with } l, m \in Z\}$$

$$= |\alpha_{j,2}(l^*) - \alpha_i| + |\beta_{j,2}(m^*) - \beta_i|$$

or for j ∈ L of a value $k^* \in Z$ with $$|\beta_j(k^*) - \beta_i| = \min\{|\beta_j(k) - \beta_i|, k \in Z\};$$

m) subsequently choice of $(\alpha_j, \beta_j)$, in which for j∈J $$(\alpha_j, \beta_j) = \begin{cases} (\alpha_{j,1}(h^*), \beta_{j,1}(k^*)) & d_{j,1} \leq d_{j,2} \\ (\alpha_{j,2}(l^*), \beta_{j,2}(m^*)) & d_{j,1} > d_{j,2} \end{cases}$$

-continued or for $j \in L$ $$(\alpha_j, \beta_j) = (\alpha_i, \beta_j(k^*));$$

n) choice of a number of triples determined according to steps a) to m)

$$(\alpha_i, \beta_i, \varphi_i) = \begin{cases} \{(\alpha_i, \beta_i, \varphi_i) \text{ for } i \in J \\ \{(*,\beta_i,\varphi_i) \text{ for } i \in L \\ \{(*,*,\varphi_i) \text{ for } i \in I, \end{cases}$$

in which all components designated * can be selected at random;

o) adaptation of the selectable components in the triples $(\alpha_i, \beta_i, \phi_i)$;

interpolation of the triples $(\alpha_i, \beta_i, \phi_i)$ selected in step n) by a spline; and use of the interpolation function in q(a,P,(p).

8. Method according to claim 7, wherein adaptation takes place of the freely selectable components of $(\alpha_i, \beta_i, \phi_i)$ using:

iMin:=min $\{i \in I\}$
iMax:=max $\{i \in I\}$
iMin:=min $\{j \in J\}$
jMax:=max $\{j \in J\}$,
so that $$\alpha_p = \begin{cases} \{\alpha_{jMin} \text{ for } 1 \le p < jMin, \\ \{\alpha_{jMax} \text{ for } jMax < p \le n \end{cases}$$

and $$\beta_p = \begin{cases} \{\beta_{iMin} \text{ for } 1 \le p < iMin, \\ \{\beta_{iMax} \text{ for } iMax < p \le n. \end{cases}$$

9. Method according to claim 8, wherein for adjacent $i,j \in J$ for all $i<p<j$, i.e. $p \notin$ a choice is made of $$\alpha_p = \alpha_i + (p-i)/(j-i) \cdot (\alpha_j - \alpha_i)$$

and correspondingly for adjacent $i,j \in I$ for all $i<p<j$, i.e. $p \notin$ is chosen $$\beta_p = \beta_i + (p-i)/(j-i) \cdot (\beta_j - \beta_i).$$

10. Device for orientation control of a robotal device, the device comprising:

an interpolation unit;

an interpolation means positioned within said interpolation unit for interpolating a given dot sequence of poses by splines, said interpolation means representing an orientation represented by Eulerian angles $A_i, B_i, C_i \in R$ expanded in the entire quantity of real numbers $R^3$, wherein the interpolation unit is constructed for separate parametrization of components of motion during interpolation.

11. Device according to claim 10, wherein the interpolation unit is constructed for the separate parameterization of positions and orientations of the manipulator.

12. Device according to claim 10, wherein the interpolation unit is constructed for the separate parameterization of on the one hand movements of auxiliary axes and on the other positions and/or orientations of the manipulator.

13. Device according to claim 10, wherein the interpolation device is set up for an orientation control by means of successive rotations through Euler angles $A_i, B_i, C_i$ and in each case directly succeeding rotations take place about axes perpendicular to one another.

14. Device according to claim 13, wherein the interpolation unit is set up for the use of expanded Euler angles $A_i, B_i, C_i \in R$.

15. Device according to claim 14, wherein the interpolation device is set up for the sequential performance of the following steps:

representation of the orientations $(A_i, B_i, C_i)$ by:

a) determining the standard Euler angles $(A_i, B_i, C_i)$;

b) for I:=$\{i=1, \ldots, n | B_i \ne \pi/2 + 2k\pi, k \in Z\}$ and $i \in I$ definition of $$(A_{i,1}(g), B_{i,1}(h), C_{i,1}(k)) = (A_i + 2g\pi, B_i + 2h\pi, C_i + 2k\pi), g, h, k \in Z;$$

and $$(A_{i,2}(l), B_{i,2}(m), C_{i,2}(o)) = (A_i + \pi + 2l\pi, \pi - B_i + 2m\pi, C_i + \pi + 2o\pi), l, m, o \in Z;$$

b) for J:=$\{i=1, \ldots, n | B_i = \pi/2 + 2k\pi, k \in Z\}$ and $i \in J$ definition of $$(A_{i,1}(t), B_{i,1}(h), C_{i,1}(k,t)) = (A_i + t, B_i + 2h\pi, C_i + t + 2k\pi), t \in R, h, k \in Z;$$

d) for L:=$\{i=1, \ldots, n | B_i = -\pi/2 + 2k\pi, k \in Z\}$ and $i \in L$ definition of $$(A_{i,1}(t), B_{i,1}(h), C_{i,1}(k,t)) = (A_i + t, B_i + 2h\pi, C_i - t + 2k\pi), t \in R, h, k \in Z;$$

e) choice of a random starting pair $(A_{iStart}, B_{iStart}, C_{iStart})$ with iStart$\in I$ f) for all $j \in \{I, \ldots, n\}$, apart from j=iStart, determining expanded Euler angles $(A_j, B_j, C_j)$ according to steps g) and h), in which $i \in (1, \ldots, n\}$ is an adjacent index, i.e. i=j+1 or i=j-1 and additionally either i=iStart or a reference pair $(A_i, B_i, C_i)$ has already been adapted according to steps g) and h);

g) for $j \in I$ determination of $$d_{j,1} = \min\{|A_{j,1}(g) - A_i| + |B_{j,1}(h) - B_i| + |C_{j,1}(k) - C_i|, g, h, k \in Z\}$$

$$d_{j,2} = \min\{|A_{j,2}(l) - A_i| + |B_{j,2}(m) - B_i| + |C_{j,2}(o) - C_i|, l, m, o \in Z\}$$

assuming the minimum for $g^*, h^*, k^*$ or $l^*, m^*, o^*$; and choice of $$(A_j, B_j, C_j) = \begin{cases} \{(A_{j,1}(g^*), B_{j,1}(n^*), C_{j,1}(k^*)), \\ \{\text{if } d_{j,1} \le d_{j,2} \\ \{(A_{j,2}(l^*), B_{j,2}(m^*), C_{j,2}(o^*)), \\ \{\text{if } d_{j,1} > d_{j,2}; \end{cases}$$

h) for $j \in J$ or $j \in L$ definition of $$dA_j(t) := |A_j(t) - A_i|$$

$$dB_j(h) := |B_j(h) - B_i|$$

$$dC_j(k,t) := |C_j(k,t) - C_i|$$

with h, k$\in Z$ and t$\in R$;

determination of h*$\in Z$ with dB$_j$(h*)=min$\{$dB$_j$(h), h$\in Z\}$;

determination of zero points of $dA_j(t)$ or $dC_j(k, t)$ with respect to t, in which $ta_{0,j}$ is the zero point of $dA_j(t)$ and $tc_{0,j}(k)$ is the zero point of $dC_j(k, t)$;

choice of $k^* \in Z$, so that the spacing of the zero points is at a minimum, i.e. $|ta_{0,j} - tc_{0,j}(k^*)| = \min\{|ta_{0,j} - tc_{0,j}(k)|, k \in Z\}$;

choice of $t^*$ random between $ta_{0,j}$ and $tc_{0,j}(k^*)$; and choice of $$(A_j, B_j, C_j) = (A_j(t^*), B_j(h^*), C_j(k^*, t^*));$$

interpolation of the triples $(A_i, B_i, C_i)$ by a spline and use of the interpolation function in the rotation matrix $R(A, B, C)$.

16. Device according to claim 15, wherein the interpolation unit is set up for the choice of $t^* = \frac{1}{2}(ta_{0,j} + tc_{0,j}(k^*))$.

17. A device for orientation control of a robotal device, the device comprising:

an interpolation unit for controlling orientation and position of the robotal device based on quaternions (qi, i=1, ..., n), wherein the interpolation unit is set up for performing the following:

representation of each quaternion on the four-dimensional unit sphere according to $$q(\alpha, \beta, \phi) = (\cos(\tfrac{1}{2}\phi), \sin(\tfrac{1}{2}\phi) \cdot v(\alpha, \beta))$$

with $$v(\alpha, \beta) = (\cos(\alpha)\cos(\beta), \sin(\alpha)\cos(\beta), \sin(\beta)),$$

in which $\alpha$, $\beta$ (and $r=1$) indicate the spherical coordinates of the rotary vectors $v = v(\alpha, \beta)$;

determining motion-optimum pairs $(v_i, \phi_i)$ by a) adapting the sign of $q_i$, so that $q_i^T q_{i+1} > 0$ for all $i=1, \ldots, n-1$;

b) for all $i=1, \ldots, n$ determination of a possible pair $(v_i, \phi_i)$ with $$q_i = (\cos(\tfrac{1}{2}\phi_i), \sin(\tfrac{1}{2}\phi_i) v_i);$$

c) choice of a random starting pair $(v_{iStart}, \phi_{iStart})$ with $iStart \in I := \{i=1, \ldots, n | q_i \neq (\pm 1, 0, 0, 0)\}$;

d) for all $j \in \{i=1, \ldots, n\}$ with the exception of $j=iStart$ determination of in each case precisely one pair $(v_j, \phi_j)$ starting from a reference pair $(v_i, \phi_i)$ in accordance with steps e) to g), in which $i \in \{1, \ldots, n\}$ is an adjacent index, i.e. $i=j1$ or $i=j-1$ and also either $i=iStart$ or the reference pair has already been adapted according to steps e) to g);

e) determination of $k^*, h^* \in Z$, so that $$|\varphi_{j,1}(k^*) - \varphi_i| = \min\{|\varphi_{j,1}(k) - \varphi_i|, k \in Z\}$$
$$= \min\{|\varphi_j + 4k - \varphi_i|, k \in Z\},$$
$$|\varphi_{j,2}(h^*) - \varphi_i| = \min\{|\varphi_{j,2}(h) - \varphi_i|, h \in Z\}$$
$$= \min\{|-\varphi_j + 4h\pi - \varphi_i|, h \in Z\};$$

f) subsequently for $j \in I$ determination of $$d_{j,1} = |\arccos(v_i^T v_j)| + |\phi_{j,1}(k^*) - \phi_i|,$$
$$d_{j,2} = |\arccos(v_i^T(-v_j))| + |\phi_{j,2}(h^*) - \phi_i|$$

or for $j \notin I$ $$d_{j,1} = |\phi_{j,1}(k^*) - \phi_i|,$$
$$d_{j,2} = |\phi_{j,2}(h^*) - \phi_i|;$$

g) subsequently in each case choice of $(v_j, \phi_j)$, where for $j \in I$ $$(v_j, \varphi_j) = \begin{cases} (v_j, \varphi_{j,1}(k^*)), & d_{j,1} \leq d_{j,2} \\ (-v_j, \varphi_{j,2}(h^*)), & d_{j,1} > d_{j,2} \end{cases}$$

or for $j \notin I$ $$(v_j, \varphi_j) = \begin{cases} (v_i, \varphi_{j,1}(k^*)) & \text{if } d_{j,1} \leq d_{j,2} \\ (v_i, \varphi_{j,2}(h^*)) & \text{if } d_{j,1} > d_{j,2}; \end{cases}$$

determination of pairs $(\alpha_i, \beta_i)$ from $v_i$ in spherical coordinate representation by:

h) calculating standard spherical coordinates $(\alpha_i, \beta_i)$ of $v_i$ for all $i \in I$:

$$v_i = (\cos(\alpha_1)\cos(\beta_i), \sin(\alpha_1)\cos(\beta_i), \sin(\beta_i));$$

i) definition of $$J := \{j \in I \text{ with } v_j \neq (0, 0, \pm 1)\},$$

$$L := \{j \in I \text{ with } v_j = (0, 0, \pm 1)\},$$

and therefore definition of expanded spherical coordinates from $R \times R$ for $i \in J$:

$$(\alpha_{i,1}(h), \beta_{i,1}(k)) = (\alpha_i + 2h\pi, \beta_i 2k\pi), h, k \in Z;$$

$$(\alpha_{i,2}(l), \beta_{i,2}(m)) = (\alpha_i + \pi + 2l\pi, -\beta_i 2m\pi), l, m \in Z;$$

for $i \in L$:

$$(\alpha_{i,1}(x), \beta_{i,1}(k)) = (x, B_i + 2k\pi), x \in R, k \in Z;$$

j) fixing a random starting pair $(\alpha_{jStart}, \beta_{iStart})$ with $jStart \in J$;

k) for all $j \in I$ with the exception of $j=jStart$, in each case single determination of expanded polar coordinates according to steps l) and m), in which $i \in I$ is an adjacent index of j, so that there is no $k \in I$ between i and j and also either $i=jStart$ or the reference pair $(\alpha_i, \beta_i)$ was already adapted according to steps l) and m);

l) determination for $j \in J$ of values $h^*, k^*, l^*, m^* \in Z$ with $$d_{j,1} = \min\{|\alpha_{j,1}(h) - \alpha_i| + |\beta_{j,1}(k) - \beta_i|, \text{ with } h, k \in Z\}$$
$$= |\alpha_{j,1}(h^*) - \alpha_i| + |\beta_{j,1}(k^*) - \beta_i|;$$
$$d_{j,2} = \min\{|\alpha_{j,2}(l) - \alpha_i| + |\beta_{j,2}(m) - \beta_i|,$$

with $l, m \in Z\}$ $$= |\alpha_{j,2}(l^*) - \alpha_i| + |\beta_{j,2}(m^*) - \beta_i|$$

or for $j \in L$ of a value $k^* \in Z$ with $$|\beta_j(k^*) - \beta_i| = \min\{|\beta_j(k) - \beta_i|, k \in Z\};$$

m) subsequent choice of $(\alpha_j, \beta_j)$, in which for $j \in J$ $$(\alpha_j, \beta_j) = \begin{cases} (\alpha_{j,1}(h^*), \beta_{j,1}(k^*)), & d_{j,1} \leq d_{j,2} \\ (\alpha_{j,2}(l^*), \beta_{j,2}(m^*)), & d_{j,1} > d_{j,2} \end{cases}$$

or for $j \in L$ $$(\alpha_j, \beta_j) = (\alpha_i, \beta_j(k^*));$$

n) choice of a number of triples determined according to steps a) to m)

$$(\alpha_i, \beta_i, \varphi_i) = \begin{cases} \{(\alpha_i, \beta_i, \varphi_i) & \text{for } i \in J \\ \{(*, \beta_i, \varphi_i) & \text{for } i \in L \\ \{(*, *, \varphi_i) & \text{for } i \notin I, \end{cases}$$

o) adapting the selectable components in the trios ($\alpha_i$, $\beta_i$, $\phi_i$);
interpolation of the triples ($\alpha_i$, $\beta_i$, $\phi_i$) selected in step n) by a spline and
use of the interpolation function in q($\alpha$, $\beta$, $\phi$).

18. Device according to claim 17, wherein the interpolation unit is set up for adapting the freely selectable components of ($\alpha_i$, $\beta_i$, $\phi_i$) using:
iMin:=mm {i∈I}
iMax:=max {i∈I}
iMin:=min {j∈J}
jMax:=max {j∈J},
so that $$\alpha_p = \begin{cases} \{\alpha_{jMin} & \text{for } 1 \le p < jMin, \\ \{\alpha_{jMax} & \text{for } jMax < p \le n \end{cases}$$

and $$\beta_p = \begin{cases} \{\beta_{iMin} & \text{for } 1 \le p < iMin, \\ \{\beta_{iMax} & \text{for } iMax < p \le n. \end{cases}$$

19. Device according to claim 18, wherein the interpolation unit is set up for adjacent i,j∈J for all i<p<j, i.e. p∉ for the determination of $$\alpha_p = \alpha_i + (p-i)/(j-i) \cdot (\alpha_j - \alpha_i)$$

and correspondingly for neighbouring i,j∈I for all i<p<j, i.e. p∉ for determining $$\beta_p = \beta_i + (p-i)/(j-i) \cdot (\beta_j - \beta_i).$$

20. A method for orientation control of a robotal device, the method comprising:
interpolating given dot sequences of poses by splines;
representing each orientation through quaternions on a four-dimensional unit sphere according to $$q(\alpha,\beta,\phi) = (\cos(\phi/2), \sin(\phi/2) \, v(\alpha,\beta))$$

$$v(\alpha,\beta) = (\cos(\alpha)\cos(\beta), \sin(\alpha)\cos(\beta), \sin(\beta))$$

wherein $\alpha$, $\beta$ represent the spherical coordinates of rotating vectors v-v($\alpha$, $\beta$);
representing spherical coordinates to determine pairs of spherical coordinates ($\alpha_i$, $\beta_i$) from rotating vectors $v_1$ by means of:
calculating the spherical coordinates ($\alpha_i$, $\beta_i$) of the $v_i$ for all i∈I:

$$v_i = (\cos(\alpha_i)\cos(\beta_i), \sin(\alpha_i)\cos(\beta_i), \sin(\beta_i);$$

defining $J := (j \in I \text{ with } v_j \ne (0,0\pm1)),$ $L := (j \in I \text{ with } v_j \ne (0,0\pm1))$ to define expanded spherical coordinates from R×R for i∈J:

$$(\alpha_{i,1}(h), \beta_{i,1}(k)) = (\alpha_i + 2h\pi, \beta_i + 2k\pi) h, k \in Z;$$

$$(\alpha_{i,2}(l), \beta_{i,2}(m)) = (\alpha_i + \pi + 2l\pi, \pi - \pi\beta_i + 2m\pi) l, m \in Z;$$

for i∈L:

$$(\alpha_i(x), \beta_i(k)) = (x, \beta_i + 2k\pi) x \in R, k \in Z;$$

positioning and orienting the robotal device based on said spherical coordinates.

21. Method in accordance with claim 20, wherein the following steps are carried out when determining pairs from the $v_i$ in spherical coordinates:
Setting any desired start pair ($\alpha_{jStart}$, $\beta_{jStart}$) with jStart ⊆J;
determination of expanded polar coordinates each according to steps l) and m) for all j⊆I with the exception of j=jStart, wherein i⊆I is a neighboring index of j, so that there is no k⊆I between i and j and, in addition, i=j Start or the reference pair ($\alpha_i$, $\beta_i$) was already fitted according to steps l) and m);
determination for j⊆J of values h*, k*, l*, m*⊆Z with $$d_{j,1} = \min\{|\alpha_{j,1}(h) - \alpha_i| + |\beta_{j,1}(k) - \beta_i|, \text{ with } h,k \subseteq Z\} = |\alpha_{j,1}(h^*) - \alpha_1| + |\beta_{j,1}(k^*) - \beta_1|;$$

$$d_{j,2} = \min\{|\alpha_{j,2}(l) - \alpha_1| + |\beta_{j,2}(m) - \beta_1|, \text{ with } l,m \subseteq 2\} = |\alpha_{j,2}(l^*) - \alpha_1| + |\beta_{j,2}(m^*) - \beta_1|$$

or for j⊆L of a value k*⊆2 with $$|\beta_j(k^*) - \beta_1| = \min\{|\beta_j(k) - \beta_i|, k \subseteq Z\};$$

subsequently selection of ($\alpha_j, \beta_j$), wherein for j⊆J $$(\alpha_j, \beta_j) = \begin{cases} (\alpha_{j,1}(h^*), \beta_{j,1}(k^*)) & d_{j,1} \le d_{j,2} \\ (\alpha_{j,2}(l^*), \beta_{j,2}(m^*)) & d_{j,1} > d_{j,2} \end{cases}$$

and for j⊆L $$(\alpha_j, \beta_j) = (\alpha_j, \beta_j(k^*));$$

selection of a number of triples determined according to steps a) through m)

$(\alpha_i, \beta_i, \phi_i)$ for i⊆J $(\alpha_i, \beta_i, \phi_{ii}) = \{(*, \beta_i, \phi_i)$ for i⊆L $(*, *, \phi_i)$ for i⊆I,
wherein all components designated by "*" are freely selectable;
fitting of the selectable components in the triples ($\alpha_i$, $\beta_i$, $\phi_i$);
interpolation of the selected triples ($\alpha_i$, $\beta_i$, $\phi_i$) by a spline; and
substitution of the interpolation function in q($\alpha$, $\beta$, $\phi$).

22. Method in accordance with claim 20 or 21, wherein the following steps are additionally carried out for the minimum reorientation from point to point:
Representation of a quarternion on the four-dimensional unit sphere according to $$q(\alpha,\beta,\phi) = (\cos \tfrac{1}{2}\phi, \sin(\tfrac{1}{2}\phi) \cdot v(\alpha,\beta))$$

with $$v(\alpha,\beta) = (\cos(\alpha)\cos(\beta), \sin(\alpha)\cos(\beta), \sin(\beta)),$$

wherein $\alpha$, $\beta$, (and r=1) indicate the spherical coordinates of the rotating vectors v=v($\alpha$, $\beta$);
determination of motion-optimal pairs ($v_1$, $\phi_1$) by
a) adapting signs of $q_i$, so that $q_i^T q_{i+1} \geq 0$ for all i=1, ..., n−1;
b) determination of a possible pair ($v_1$, $\phi_1$) for all i=1, ..., n with $q_1 = (\cos(\frac{1}{2}\phi_1), \sin(\frac{1}{2}\phi_1)v_1)$;
c) selection of any desired start pair ($V_{iStart}$, $\phi_{iStart}$), with 1Start $\subseteq$ I:={1=1, ..., n|$q_i \neq (\pm 1, 0, 0, 0)$}
d) determination of exactly one pair ($v_j$, $\phi_j$) for all j $\subseteq$ (1, ..., n) with the exception of j=iStart, starting from a reference pair ($v_i$, $\phi_i$) according to the steps e) through g), wherein i $\subseteq$ (1, ..., n) is a neighboring index, i.e., i=j1 or i=j−1 and, furthermore, either is i=iStart true or the reference pair was already fitted according to steps e) through g);
e) determination of k*, h* $\subseteq$ Z so that $$|\varphi_{j,1}(k^*) - \varphi_i| = \min\{|\varphi_{j,1}(k) - \varphi_i|, k \subseteq Z\}$$
$$= \min(|\varphi_j + 4k\pi - \varphi_i|, k \subseteq Z),$$
$$|\varphi_{j,2}(h^*) - \varphi_1| = \min\{|\varphi_{j,2}(h) - \varphi_1|, h \subseteq Z\}$$
$$= \min(|-\varphi_j + 4h\pi - \varphi_i|, h \subseteq Z];$$

f) subsequently determination of $$d_{j,1} = \arccos(v_i^T v_j) + |\phi_{j,1}(k^*) - \phi_i|,$$
$$d_{j,2} = \arccos(v_i^T(-v_j)) + |\phi_{j,2}(h^*) - \phi_i|$$

for j $\subseteq$ I and of $$d_{j,1} = |\phi_{j,1}(k^*) - \phi_1|,$$
$$d_{j,2} = |\phi_{j,2}(h^*) - \phi_1|,$$

for j $\subseteq$ I;
g) then, selection of ($v_j$, $\phi_j$), wherein $$(v_j, \varphi_j) = \begin{cases} (v_j, \varphi_{j,1}(k^*)), & d_{j,1} \leq d_{j,2} \\ ((-v_j, \varphi_{j,2}(h^*)), & d_{j,1} > d_{j,2} \end{cases}$$

for $j \subseteq 1$, and $$(v_j, \varphi_j) = \begin{cases} (v_i, \varphi_{j,1}(k^*)) & \text{if } d_{j,1} \leq d_{j,2} \\ (v_i, \varphi_{j,2}(h^*)) & \text{if } d_{j,1} > d_{j,2} \end{cases}$$

for $j \subseteq I$.

23. Method in accordance with claim 22, wherein the fitting of the freely selectable components of ($\alpha_i$, $\beta_i$, $\phi_i$) using
iMin:=min {i $\subseteq$ I}
iMax:=max {i $\subseteq$ I}
iMin:=min {j $\subseteq$ J}
jMax:=max {j $\subseteq$ J},
so that $$\alpha_P = \begin{cases} \alpha_{iMin} & \text{for } 1 \leq p < j\text{Min}, \\ \alpha_{iMax} & \text{for } j\text{Max} < p \leq n \end{cases} \text{ and }$$

$$\beta_P = \begin{cases} \beta_{iMin} & \text{for } 1 \leq p < i\text{Min}, \\ \beta_{iMax} & \text{for } i\text{Max} < p \leq n. \end{cases}$$

24. A device for orientation control of a robotal device, the device comprising:
an interpolation unit;
an interpolation means located within said interpolation unit for interpolating a given dot sequence of poses by splines, said interpolation means representing an orientation represented by quarternions on a four-dimensional sphere according to $$q(\alpha,\beta,\phi) = (\cos(\phi/2), \sin(\phi/2) v(\alpha,\beta))$$

$v(\alpha, \beta) = (\cos(\alpha) \cos(\beta), \sin(\alpha) \cos(\beta), \sin(\beta))$, wherein $\alpha$, $\beta$ indicate spherical coordinates of rotating vectors v-v($\alpha$, $\beta$); and
means for calculating spherical coordinates ($\alpha_i$, $\beta_i$) of the $v_i$ for all i$\in$I:

$$v_i = (\cos(\alpha_i) \cos(\beta_i), \sin(\alpha_i) \cos(\beta_i) \sin(\beta_i));$$

and means for defining $J := (j \in I$ with $v_j \neq (0,0,\pm 1)$, $L := (j \in I$ with $v_j = (0,0,\pm 1)$, to define expanded spherical coordinates from R×R
for i$\in$J:

$(\alpha_{i,1}(h), \beta_{i,1}(k)) = (\alpha_i + 2h\pi, \beta_i + 2k\pi)h, k \in Z$;

$(\alpha_{i,2}(l), \beta_{i,2}(m)) = (\alpha_i + \pi + 2l\pi, \pi - \beta_i 2m\pi)l, m \in Z$;

for i$\in$L:

$(\alpha_i(x), \beta_i(k)) = (x, \beta_i + 2k\pi)x \in R, k \in Z$.

25. Device in accordance with claim 24, wherein the interpolation means performs the following steps during the determination of pairs ($\alpha_1$, $\beta_1$) from the $v_1$ values in a representation in spherical coordinates:
setting of any desired start pair ($\alpha_{jStart}$, $\beta_{jStart}$) with jStart $\subseteq$ J;
determination of expanded polar coordinates according to steps l) and m) once each for all j $\subseteq$ I with the exception of j=jStart, wherein l $\subseteq$ I is a neighboring index of j, so that there is no k $\subseteq$ I between i and j, and, in addition, either is i=jStart true, or the reference pair ($\alpha_1$, $\beta_1$ was already fitted according to the steps l) and m);
determination of values h*, k*, l*, m $\subseteq$ $\subseteq$ Z with $d_{j,1} = \min\{|\alpha_{j,1}(h) - \alpha_i| + |\beta_{j,1}(k) - \beta_i|$, with $h, k \subseteq Z\} = a_{j,1}(h^*) - \alpha_1| + |\beta_{j,1}(k^*) - \beta_1|$;

$d_{j,2} = \min\{|\alpha_{j,2}(l) - \alpha_i| + |\beta_{j,2}(m) - \beta_i|$, with $l, m \subseteq Z\} = \alpha_{j,2}(l^*) - \alpha_1| + |\beta_{j,2}(m^*) - \beta_1|$ for j $\subseteq$ J, and determination of a value k* $\subseteq$ Z for j $\subseteq$ L with $\beta_j(k^*) - \beta_1| - \min\{|\beta_j(k) - \beta_1|k \subseteq Z\}$;

then, selection of ($\alpha_j$, $\beta_j$), wherein $$(\alpha_j, \beta_j) = \begin{cases} (\alpha_{j,1}(h^*), \beta_{j,1}(k^*)), & d_{j,1} \leq d_{j,2} \\ (\alpha_{j,2}(l^*), \beta_{j,2}(m^*)), & d_{j,1} > d_{j,2} \end{cases}$$

for j $\subseteq$ J, and $(\alpha_j, \beta_j) = (\beta_i, \beta_j(k^*))$ for j $\subseteq$ L;
selection of a number of triples determined according to steps a) through m)

$$(\alpha_1, \beta_1, \varphi_1) = \begin{cases} (\alpha_1, \beta_1, \varphi_1) & \text{for } i \subseteq J \\ (*, \beta_1, \varphi_1) & \text{for } i \subseteq L \\ (*, *, \varphi_1) & \text{for } i \subseteq I, \end{cases}$$

wherein all components designated by "*" are freely selectable;

fitting of the selectable components into the triples $(\alpha_i, \beta_i, \phi_i)$;

interpolation of the triples $(\alpha_i, \beta_i, \phi_i)$ selected in step n) by a spline; and substitution of the interpolation functions in $q(\alpha_i, \beta_i, \phi_i)$.

26. Device in accordance with claim 24 or 25, wherein the interpolation means performs the following steps:

representation of each quaternion on the four-dimensional unit sphere according to $$q(\alpha,\beta,\phi)=(\cos(\tfrac{1}{2}\phi), \sin(\tfrac{1}{2}\phi)\cdot v(\alpha,\beta))$$

with $$v(\alpha,\beta)=(\cos(\alpha)\cos(\beta), \sin(\alpha)\cos(\beta), \sin(\beta)),$$

wherein $\alpha$, $\beta$, (and r=1) indicate the spherical coordinates of the rotating vectors $v=v(\alpha, \beta)$;

determination of motion-optimal pairs $(v, \phi_i)$ by a) fitting signs of $q_i$, so that $q_i^T q_{i+1} \geq 0$ for all i=1, ..., n−1;

b) determination of a possible pair $(v_1, \phi_1)$ for all i= 1, ..., n, with $q_1=(\cos(\tfrac{1}{2}\phi_1), \sin(\tfrac{1}{2}\phi_1)v_1)'$ c) selection of any desired start pair $(V_{iStart}, \phi_{iStart})$ with iStart $\subseteq$ I:=}i=1, ..., n|$q_i \neq (\pm 1, 0, 0, 0)$};

d) determination of exactly one pair $(v_j, \phi_j)$ for all j $\subseteq$ (1, ..., n) with the exception of j=iStart, starting from a reference pair $(v_i, \phi_i)$ according to steps e) through g), wherein i $\subseteq$ (1, ..., n) is a neighboring index, i.e., i=j1 or i=j−1 and, further, either is 1=1iStart true, or the reference pair was already fitted according to steps e) through g);

e) determination of k* h* $\subseteq$, so that $$|\varphi_{j,1}(k^*) - \varphi_1| = \min\{|\varphi_{j,1}(k) - \varphi_1|, k \subseteq Z\}$$

$$= \min\{|\varphi_j + 4k\pi - \varphi_i|, k \subseteq Z\},$$

$$|\varphi_{j,2}(h^*) - \varphi_i| = \min\{|\varphi_{j,2}(h) - \varphi_i|, h \subseteq Z\}$$

-continued $$= \min\{|-\varphi_1 + 4h\pi - \varphi_i|, h \subseteq Z\};$$

f) then, determination of $$d_{j,1} = \arccos(v_1^T v_j) + |\phi_{j,1}(k^*) - (\phi_1|,$$

$$d_{j,2} = \arccos(v_1^T(-v_j)) + |\phi_{j,2}(h^*) - (\phi_1|$$

for j $\subseteq$ I, and of $$d_{j,1} = |\phi_{j,1}(k^*) - \phi_i|,$$

$$d_{j,2} = |\phi_{j,2}(h^*) - \phi_i|$$

for j $\subseteq$ I;

g) then, selection of $(v_j, \phi_j)$, wherein $$(v_j, \varphi_j) = \begin{cases} (v_j, \varphi_{j,1}(K^*)), & d_{j,1} \leq d_{j,2} \\ (-v_j, \varphi_{j,2}(h^*)), & d_{j,1} > d_{j,2} \end{cases}$$

for j $\subseteq$ I, and of $$(v_j, \varphi_j) = \begin{cases} (v_i, \varphi_{j,1}(k^*)) & \text{if } d_{j,1} \leq d_{j,2} \\ (v_i, \varphi_{j,2}(h^*)) & \text{if } d_{j,1} > d_{j,2} \end{cases}$$

for j $\subseteq$ I.

27. Device in accordance with claim 26, wherein the interpolation means is set up for fitting the freely selectable components of $(\alpha_i, \beta_i, \phi_i)$ using iMin:=min {i $\subseteq$ I}
iMax:=max {i $\subseteq$ I}
iMin:=min {j $\subseteq$ J}
jMax:=max {j $\subseteq$ J} such that $$\alpha_p = \begin{cases} \alpha_{1\min} & \text{for } 1 \leq p < j\text{Min}, \\ \alpha_{1\text{Max}} & \text{for } j\text{Max} < p \leq n \end{cases} \text{ and}$$

$$\beta_p = \begin{cases} \beta_{i\text{Min}} & \text{for } 1 \leq p < i\text{Min}, \\ \beta_{i\text{Max}} & \text{for } i\text{Max} < p \leq n. \end{cases}$$

* * * * *